(12) United States Patent
Katsuyama

(10) Patent No.: US 9,860,423 B2
(45) Date of Patent: Jan. 2, 2018

(54) IMAGE PROCESSING DEVICE AND METHOD, PRINTING SYSTEM, HALFTONE PROCESS DETERMINATION METHOD, AND PROGRAM

(71) Applicant: FUJIFILM Corporation, Tokyo (JP)

(72) Inventor: Kimito Katsuyama, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/276,286

(22) Filed: Sep. 26, 2016

(65) Prior Publication Data

US 2017/0013165 A1    Jan. 12, 2017

Related U.S. Application Data

(63) Continuation of application No. PCT/JP2015/059347, filed on Mar. 26, 2015.

(30) Foreign Application Priority Data

| Mar. 27, 2014 | (JP) | ................. | 2014-066005 |
| Mar. 27, 2014 | (JP) | ................. | 2014-066006 |
| Mar. 27, 2014 | (JP) | ................. | 2014-066007 |

(51) Int. Cl.
| B41J 2/21 | (2006.01) |
| H04N 1/405 | (2006.01) |
| B41J 2/205 | (2006.01) |
| H04N 1/60 | (2006.01) |

(52) U.S. Cl.
CPC .......... *H04N 1/4052* (2013.01); *B41J 2/2054* (2013.01); *B41J 2/2139* (2013.01); *H04N 1/4051* (2013.01); *H04N 1/6041* (2013.01)

(58) Field of Classification Search
None
See application file for complete search history.

(56) References Cited

U.S. PATENT DOCUMENTS 5,703,695 A    12/1997   Nguyen
5,809,366 A *  9/1998   Yamakawa ............ H04N 1/407
                                                                358/519

(Continued)

FOREIGN PATENT DOCUMENTS

EP    0665677 A2    8/1995
EP    0734152 A2    9/1996

(Continued)

OTHER PUBLICATIONS

Japanese Office Action dated Sep. 13, 2016 in Application No. 2014-066005 with an English translation thereof.

(Continued)

*Primary Examiner* — Barbara Reinier
(74) *Attorney, Agent, or Firm* — McGinn IP Law Group, PLLC.

(57) ABSTRACT

There are provided image processing device and method, a printing system, a halftone process determination method, and a program capable of determining a processing rule of an appropriate halftone process appropriate for characteristics of a printing system. An image processing device (20) according to the present invention includes characteristic parameter acquisition means (52) for acquiring characteristic parameters related to characteristics of a printing system, and halftone process generation means (58) for generating halftone processing rules that define the processing contents of two or more kinds of halftone processes of which balances of priority for a plurality of requirements required in the halftone process are different based on the characteristic parameters acquired by the characteristic parameter acquisition means (52).

19 Claims, 18 Drawing Sheets

(56) References Cited

U.S. PATENT DOCUMENTS

| | | | |
|---|---|---|---|
| 5,856,876 A | 1/1999 | Sasanuma et al. | |
| 6,040,927 A | 3/2000 | Winter et al. | |
| 8,792,136 B2 | 7/2014 | Wakui | |
| 2005/0134852 A1* | 6/2005 | Cumming | H04N 1/00002 356/402 |
| 2006/0119874 A1 | 6/2006 | Kurihara | |
| 2006/0262329 A1 | 11/2006 | Fujimori | |
| 2007/0201097 A1* | 8/2007 | Anderson | G03G 15/5062 358/3.06 |
| 2008/0218814 A1* | 9/2008 | Ferlitsch | H04N 1/6011 358/500 |
| 2011/0234673 A1 | 9/2011 | Ueshima | |
| 2012/0257256 A1* | 10/2012 | Wakui | H04N 1/405 358/3.06 |
| 2015/0043836 A1 | 2/2015 | Shibata | |

FOREIGN PATENT DOCUMENTS

| | | |
|---|---|---|
| JP | H 08-088771 A | 4/1996 |
| JP | H 09-09085 A | 1/1997 |
| JP | 2001-158133 A | 6/2001 |
| JP | 2004-080109 A | 3/2004 |
| JP | 2006-186755 A | 7/2006 |
| JP | 2010-141395 A | 6/2010 |
| JP | 2011-201121 A | 10/2011 |
| JP | 2012-222433 A | 11/2012 |
| JP | 2013-224000 A | 10/2013 |

OTHER PUBLICATIONS

Japanese Office Action dated Sep. 13, 2016 in Application No. 2014-066007 with an English translation thereof.

International Search Report (ISR) (PCT Form PCT/ISA/210), in PCT/JP2015/059347, dated Jun. 23, 2015.

The Written Opinion of the ISA/JPO (PCT/ISA/237) in PCT/JP2015/059347, dated Jun. 23, 2015 and English translation thereof.

Extended European Search Report dated May 11, 2017 in the European Patent Application No. 15 769 136.1.

Japanese Office Action dated Apr. 21, 2017 in Application No. 2014-066005, with an English translation thereof.

* cited by examiner

FIG. 7

| INTER-DOT DISTANCE (SET VALUE) | CHANGE IN INTER-DOT DISTANCE DUE TO LANDING INTERFERENCE |
|---|---|
| d1 | u1 |
| d2 | u2 |
| d3 | u3 |

| HT ALGORITHM | IMAGE QUALITY | SYSTEM COST | HALFTONE GENERATING TIME | HALFTONE PROCESSING TIME |
|---|---|---|---|---|
| DITHER METHOD | LOW | LOW | SHORT | SHORT |
| ERROR DIFFUSION METHOD | MEDIUM | MEDIUM | MEDIUM | MEDIUM |
| Direct Binary Search METHOD | HIGH | HIGH | LONG | LONG |

FIG. 13

IMAGE PROCESSING DEVICE AND METHOD, PRINTING SYSTEM, HALFTONE PROCESS DETERMINATION METHOD, AND PROGRAM

CROSS-REFERENCE TO RELATED APPLICATIONS

The present application is a Continuation of PCT International Application No. PCT/JP2015/059347 filed on Mar. 26, 2015 claiming priority under 35 U.S.C §119(a) to Japanese Patent Application No. 2014-066005 filed on Mar. 27, 2014, Japanese Patent Application No. 2014-066006 filed on Mar. 27, 2014 and Japanese Patent Application No. 2014-066007 filed on Mar. 27, 2014. Each of the above applications is hereby expressly incorporated by reference, in their entirety, into the present application.

BACKGROUND OF THE INVENTION

1. Field of the Invention

The present invention relates to image processing device and method, a printing system, a halftone process determination method, and a program, and more particularly, to an image processing technology that generates a printing halftone image from a continuous-tone image.

2. Description of the Related Art

In a printing system in which a printing device such as an ink jet printing device or an offset printing device forms an image, a halftone process is performed on data of a continuous-tone image expressed by multiple gradations, and thus, data of a halftone image corresponding to an image output mode of the printing device is generated. The data of the halftone image is used as printing dot image data indicating a dot pattern in which dot arrangement of halftone dots reproduced by the printing device or a size of each dot is defined. The printing device forms an image based on the data of the halftone image.

As the method of the halftone process, there are various methods such as a dither method, an error diffusion method, and a direct binary search (DBS) method. For example, in the dither method, multi-value data of the continuous-tone image is converted into binary dot data by comparing a threshold and a pixel value of a processing target pixel using a threshold matrix called a dither mask, assigning dot-ON pixels in a case where the pixel value is equal to or greater than the threshold and assigning dot-OFF pixels in a case where the pixel value is less than the threshold.

JP2012-222433A describes a printing system capable of selecting a halftone process appropriate for a printed material in consideration of productivity of the printed material. The printing system described in JP2012-222433A may select one signal processing condition from signal processing conditions of a plurality of halftone processes having different dot distribution characteristics, and may perform the halftone process using the selected signal processing condition.

SUMMARY OF THE INVENTION

As described in JP2012-222433A, in the printing system, what kind of halftone process is adopted is closely related to image quality of a printed material, production cost and a required time. That is, for example, as the requirements required in the halftone process, there is a plurality of different requirements such as image quality, cost, a halftone generating time and a halftone processing time.

In a case where the requirement of "image quality" is taken into consideration, there is a need for tolerance to a system error in addition to viewpoint of good or bad of "granularity". The tolerance to the system error refers to robustness that the image quality deterioration such as the granularity deterioration or the streak occurrence of the print image is hard to occur even in a case where various error causes such as variation in recording performance of the printing element of the printing device and the transport error of the printing medium are added in the printing system. The tolerance to the system error is required in a case where it is necessary to produce a plurality of printed materials with stable image quality.

The system errors are not limited to the errors having reproducibility as characteristics specific to the each device or the type of the printing device, and may be an error occurring temporally, or an error occurring incidentally. For example, since the density of the ink or the spreading amount of the ink is changed by the influence of the temperature or humidity, there is also a requirement such as image quality tolerance to such an environment change.

The plurality of aforementioned requirements required in the halftone process has the trade-off relationship, and all the requirements are not hardly satisfied at a high level. Thus, it is considerably difficult to uniquely determine an optimum halftone process for the printing system. When the printing is performed, it is necessary to apply an appropriate halftone process in consideration of the balances of priority for the plurality of requirements.

The invention has been made in view of such circumstances, and it is an object of the invention to provide image processing device and method, a printing system, and a program which are capable of determining a processing rule of an appropriate halftone process appropriate for characteristics of a printing system.

since halftone performance for each requirement required in the halftone process is changed depending on the characteristics of the printing system, it is considerably difficult to uniquely determine an optimum halftone process in the printing system.

The invention has been made in view of such circumstances, and it is another object of the invention to provide a printing system, a halftone process determination method, an image processing device, and a program which are capable of satisfying halftone performance required by a user and determining an optimum halftone process appropriate for characteristics of a printing system.

It is another object of the invention to provide image processing device and method, a printing system, and a program which are capable of generating an optimum halftone process that satisfies required halftone performance so as to be appropriate for characteristics of a printing system.

In order to achieve the aforementioned objects, the following invention aspects are provided.

An image processing device according to a first aspect is an image processing device comprising: characteristic parameter acquisition means for acquiring characteristic parameters related to characteristics of a printing system; and halftone process generation means for generating halftone processing rules that define the processing contents of two or more kinds of halftone processes of which balances of priority for a plurality of requirements required in the halftone process are different based on the characteristic parameters acquired by the characteristic parameter acquisition means.

According to the first aspect, it is possible to generate two or more kinds of halftone processing rules appropriate for the printing system, and it is possible to select and use an appropriate halftone processing rule from the two or more kinds of halftone processing rules.

As a second aspect, in the image processing device according to the first aspect, the halftone processing rule may be specified by a combination of a halftone algorithm and a halftone parameter, and in the two or more kinds of halftone processes, at least one of the halftone algorithm or the halftone parameter may be different.

As a third aspect, in the image processing device according to the second aspect, the halftone algorithm may include at least one method of a dither method, an error diffusion method, or a direct binary search method.

As a fourth aspect, in the image processing device according to the second aspect or the third aspect, the halftone parameter may include at least one parameter of a threshold and a size of a dither mask in the dither method, a size of an error diffusion matrix, a diffusion coefficient, and setting of an applied gradation section of the error diffusion matrix in the error diffusion method, the number of times pixels are updated and an exchange pixel range in the direct binary search method, or a parameter for evaluating system error tolerance.

As a fifth aspect, in the image processing device according to any one of the first aspect to the fourth aspect, the printing system may include an image forming unit that includes a plurality of printing elements serving to form dots on a printing medium, and the characteristics of the printing system may be characteristics that include at least one of individual recording characteristics of the plurality of printing elements or common characteristics to the plurality of printing elements.

As a sixth aspect, in the image processing device according to the fifth aspect, the recording characteristics may be characteristics that include at least one of a dot density, a dot diameter, a dot shape, a dot recording position error, or recording inexecutable abnormality.

As a seventh aspect, in the image processing device according to the fifth aspect to the sixth aspect, the common characteristics may be characteristics that include at least one of an average dot density, an average dot diameter, an average dot shape, or landing interference.

As an eighth aspect, in the image processing device according to any one of the first aspect to the seventh aspect, the characteristic parameter acquisition means may include image analysis means for acquiring information related to the characteristic parameters by analyzing a read image of a characteristic parameter acquisition chart printed by the printing system.

As a ninth aspect, in the image processing device according to any one of the first aspect to the eighth aspect, the characteristic parameter acquisition means may include a user interface that allows a user to perform an input operation.

As a tenth aspect, in the image processing device according to any one of the first aspect to the ninth aspect, the plurality of requirements may include at least two items of image quality, cost, a halftone generating time, a halftone processing time, tolerance to a system error, or tolerance to environment change.

As an eleventh aspect, the image processing device according to any one of the first aspect to the tenth aspect may further comprise: a priority input unit for allowing a user to input information related to priorities for the plurality of requirements.

As a twelfth aspect, the image processing device according to any one of the first aspect to the eleventh aspect may further comprise: halftone registration means for registering the two or more kinds of halftone processing rules generated by the halftone process generation means, as candidates of the halftone process capable of being used in the printing system.

A printing system according to a thirteenth aspect is a printing system comprising: the image processing device according to any one of the first aspect to the twelfth aspect; and a printing device that performs printing on a printing medium based on a halftone image generated through the halftone process defined by the halftone processing rule.

A printing system according to a fourteenth aspect is a printing system comprising: characteristic parameter acquisition means for acquiring characteristic parameters related to characteristics of a printing system; halftone process generation means for generating halftone processing rules that define the processing contents of two or more kinds of halftone processes of which balances of priority for a plurality of requirements required in the halftone process are different based on the characteristic parameters acquired by the characteristic parameter acquisition means; and a printing device that performs printing on a printing medium based on a halftone image generated through the halftone process defined by the halftone processing rule.

In the printing system according to the fourteenth aspect, it is possible to appropriately combine the same matters as the matters specified in the second aspect to the twelfth aspect.

As a fifteenth aspect, the printing system according to the thirteenth aspect or the fourteenth aspect may further comprise: halftone selection operating means for allowing a user to perform an operation of selecting the kind of the halftone process used in printing from the kinds of the halftone processes defined by the two or more kinds of halftone processing rules generated by the halftone process generation means.

As a sixteenth aspect, the printing system according to any one of the thirteenth aspect to the fifteenth aspect may further comprise: halftone-selection-chart output means for outputting a halftone selection chart including quality comparison and evaluation image regions of the halftone processes by using the two or more kinds of halftone processing rules generated by the halftone process generation means.

As a seventeenth aspect, the printing system according to any one of the thirteenth aspect to the sixteenth aspect may further comprise: evaluation value calculation means for calculating an evaluation value for quantitatively evaluating at least one item of image quality, cost, a halftone generating time or a halftone processing time of the halftone process defined by the halftone processing rule; and information presentation means for presenting information of the evaluation value to a user.

As an eighteenth aspect, the printing system according to any one of the thirteenth aspect to the seventeenth aspect may further comprise: halftone automatic selection means for automatically selecting the kind of the halftone process used in printing from the kinds of the halftone processes defined by the two or more kinds of halftone processing rules generated by the halftone process generation means.

As a nineteenth aspect, the printing system according to the eighteenth aspect may further comprise: priority parameter retention means for retaining priority parameters related to priorities for the plurality of requirements. The halftone automatic selection means may automatically select the kind of the halftone process based on the priority parameters retained in the priority parameter retention means.

As a twentieth aspect, the printing system according to any one of the thirteenth aspect to the nineteenth aspect may further comprise: image reading means for reading an image printed by the printing system.

An image processing method according to a twenty-first aspect is an image processing method comprising: a characteristic parameter acquisition step of acquiring characteristic parameters related to characteristics of a printing system; and a halftone process generation step of generating halftone processing rules that define the processing contents of two or more kinds of halftone processes of which balances of priority for a plurality of requirements required in the halftone process are different based on the characteristic parameters acquired in the characteristic parameter acquisition step.

In the twenty-first aspect, it is possible to appropriately combine the same matters as the matters specified in the second aspect to the twentieth aspect. In this case, a processing unit or a functional unit (means) as means serving as the process or function specified in the image processing device or the printing system may be comprehended as an element of a "step" of a corresponding process or operation.

A program according to a twenty-second aspect is a program causing a computer to function as: characteristic parameter acquisition means for acquiring characteristic parameters related to characteristics of a printing system; and halftone process generation means for generating halftone processing rules that define the processing contents of two or more kinds of halftone processes of which balances of priority for a plurality of requirements required in the halftone process are different based on the characteristic parameters acquired by the characteristic parameter acquisition means.

It is possible to appropriately combine the same matters as the matters specified in the second aspect to the twentieth aspect with the program according to the twenty-second aspect. In this case, a processing unit or a functional unit (means) as means serving as the process or function specified in the image processing device or the printing system may be comprehended as an element of a program for realizing means of a corresponding process or operation.

A printing system according to a twenty-third aspect is a printing system comprising: halftone-selection-chart output means for outputting a halftone selection chart including quality comparison and evaluation image regions of the halftone processes by using two or more kinds of halftone processing rules of which balances of priority for a plurality of requirements required in the halftone process are different; and halftone selection operating means for receiving a user operation of selecting the kind of any one halftone process from the two or more kinds of halftone processes used in the halftone selection chart output by the halftone-selection-chart output means.

According to the twenty-third aspect, it is possible to check the processing results of the two or more kinds of halftone processes from the printing result of the halftone selection chart. The user can perform the operation of selecting a desired halftone process by checking the quality of each halftone process in the printing system based on the printing result of the halftone selection chart.

As a twenty-fourth aspect, in the printing system according to the twenty-third aspect, the halftone selection chart may have a configuration in which the comparison and evaluation image regions for the kinds of the halftone processing rules indicating the processing results of the two or more kinds of halftone processes are arranged on one printing medium.

According to the twenty-fourth aspect, it is possible to easily compare the processing results of the two or more kinds of halftone processes on one printed material. Thus, it is possible to easily perform the determination or the evaluation of whether the halftone process is good or bad.

As a twenty-fifth aspect, the printing system according to the twenty-third aspect or the twenty-fourth aspect may further comprise: evaluation value calculation means for calculating an evaluation value for quantitatively evaluating at least one item of image quality, cost, a halftone generating time or a halftone processing time of the halftone process. The halftone-selection-chart output means may output information of the evaluation value while being added to the halftone selection chart.

According to the twenty-fifth aspect, it is possible to use information of a quantitative evaluation value as one of determination information when the processing results of the halftone processes are evaluation and determined.

As a twenty-sixth aspect, in the printing system according to any one of the twenty-third aspect to the twenty-fifth aspect, the halftone-selection-chart output means may output images having the same halftone processing result at different printing timings multiple times.

According to the twenty-sixth aspect, it is possible to acquire information related to a temporal system error indicating instability of the printing system with time. According to the twenty-sixth aspect, it is possible to check tolerance of the quality of the halftone process to the temporal system error.

As a twenty-seventh aspect, in the printing system according to any one of the twenty-third aspect to the twenty-sixth aspect, the halftone-selection-chart output means may output images having the same halftone processing result in different positions on a printing medium multiple times.

According to the twenty-seventh aspect, it is possible to acquire information of a spatial system error indicating instability of the printing system depending on a position (place) on the printing medium. According to the twenty-seventh aspect, it is possible to check tolerance of the quality of the halftone process to the system error depending on the printing position.

As a twenty-eighth aspect, in the printing system according to any one of the twenty-third aspect to the twenty-seventh aspect, the halftone processing rules that define the processing contents of the two or more kinds of halftone processes may be generated based on the characteristic parameters related to the characteristics of the printing system.

The printing system according to the twenty-eighth aspect may include characteristic parameter acquisition means for acquiring characteristic parameters related to characteristics of a printing system, and halftone process generation means for generation halftone processes that define the processing contents of two or more kinds of halftone processes of which balances of priority for a plurality of requirements required in the halftone process are different based on the characteristic parameters acquired by the characteristic parameter acquisition means.

As a twenty-ninth aspect, in the printing system according to the twenty-eighth aspect, the halftone processing rule may be specified by a combination of a halftone algorithm and a halftone parameter, and in the two or more kinds of halftone processes, at least one of the halftone algorithm or the halftone parameter may be different.

As a thirtieth aspect, in the printing system according to of the twenty-ninth aspect, the halftone algorithm may include at least one method of a dither method, an error diffusion method, or a direct binary search method.

As a thirty-first aspect, in the printing system according to the twenty-ninth aspect or the thirtieth aspect, the halftone parameter may include at least one parameter of a threshold and a size of a dither mask in the dither method, a size of an error diffusion matrix, a diffusion coefficient, and setting of an applied gradation section of the error diffusion matrix in the error diffusion method, the number of times pixels are updated and an exchange pixel range in the direct binary search method, or a parameter for evaluating system error tolerance.

As a thirty-second aspect, in the printing system according to any one of the twenty-eighth aspect to the thirty-first aspect, the printing system may include an image forming unit that includes a plurality of printing elements serving to form dots on a printing medium, and the characteristics of the printing system may be characteristics that include at least one of individual recording characteristics of the plurality of printing elements or common characteristics to the plurality of printing elements.

As a thirty-third aspect, in the printing system according to the thirty-second aspect, the recording characteristics may be characteristics that include at least one of a dot density, a dot diameter, a dot shape, a dot recording position error, or recording inexecutable abnormality.

As a thirty-fourth aspect, in the printing system according to the thirty-second aspect or the thirty-third aspect, the common characteristics may be characteristics that include at least one of an average dot density, an average dot diameter, an average dot shape, or landing interference.

As a thirty-fifth aspect, in the printing system according to any one of the twenty-third aspect to the thirty-fourth aspect, the plurality of requirements may include at least two items of image quality, cost, a halftone generating time, a halftone processing time, tolerance to a system error, or tolerance to environment change.

A halftone process determination method according to a thirty-sixth aspect is a halftone process determination method of determining the kind of a halftone process used to generate a halftone image. The method comprises: a halftone-selection-chart output step of outputting a halftone selection chart including quality comparison and evaluation image regions of the halftone processes by using two or more kinds of halftone processes of which balances of priority for a plurality of requirements required in the halftone process are different; and a halftone selection operating step of receiving a user operation of selecting the kind of any one halftone process from the two or more kinds of halftone processes used in the halftone selection chart output in the halftone-selection-chart output step.

In the thirty-sixth aspect, it is possible to appropriately combine the same matters as the matters specified in the twenty-fourth aspect to the thirty-fifth aspect. In this case, a processing unit or a functional unit (means) as means serving as the process or function specified in the printing system may be comprehended as an element of a "step" of a corresponding process or operation.

An image processing device according to a thirty-seventh aspect is an image processing device comprising: halftone-selection-chart generation means for generating chart data of a halftone selection chart including quality comparison and evaluation image regions of the halftone processes by using two or more kinds of halftone processes of which balances of priority for a plurality of requirements required in the halftone process are different; and halftone selection operating means for receiving a user operation of selecting the kind of any one halftone process from the two or more kinds of halftone processes used in the halftone selection chart printed based on the chart data.

According to the thirty-seventh aspect, the halftone selection chart is output by the printing system based on the chart data of the halftone selection chart generated by the image processing device. It is possible to check the processing results of the two or more kinds of halftone processes from the printing result of the halftone selection chart. The user can perform the operation of selecting a desired halftone process by checking the quality of each halftone process in the printing system based on the printing result of the halftone selection chart.

In the thirty-seventh aspect, it is possible to appropriately combine the same matters as the matters specified in the twenty-fourth aspect to the thirty-fifth aspect.

A program according to a thirty-eighth aspect is a program causing a computer to function as: halftone-selection-chart generation means for generating chart data of a halftone selection chart including quality comparison and evaluation image regions of the halftone processes by using two or more kinds of halftone processes of which balances of priority for a plurality of requirements required in the halftone process are different; and halftone selection operating means for receiving a user operation of selecting the kind of any one halftone process from the two or more kinds of halftone processes used in the halftone selection chart printed based on the chart data.

In the thirty-eighth aspect, it is possible to appropriately combine the same matters as the matters specified in the twenty-fourth aspect to the thirty-fifth aspect. In this case, a processing unit or a functional unit (means) as means serving as the process or function specified in the printing system may be comprehended as an element of a program for realizing means of a corresponding process or operation.

An image processing device according to a thirty-ninth aspect is an image processing device comprising: characteristic parameter acquisition means for acquiring characteristic parameters related to characteristics of a printing system; priority parameter retention means for retaining priority parameters related to priorities for a plurality of requirements required in a halftone process; and halftone process generation means for generating halftone processing rules that define the processing contents of halftone processes used in the printing system based on the characteristic parameters and the priority parameters.

As a configuration example of the halftone process generation means, one kind of halftone processing rule may be ultimately acquired by generating two or more kinds of halftone processing rules and specifying an optimum halftone processing rule from these rules based on the priority parameters. As another configuration example of the halftone process generation means, the optimum solution of the halftone processing rule capable of maximizing or minimizing the evaluation value may be acquired while calculating the evaluation value for evaluating the performance of the halftone process by using the evaluation function on which the priority parameter is reflected.

According to the thirty-ninth aspect, it is possible to acquire an optimum halftone processing rule which satisfies the required halftone performance and is appropriate for the characteristics of the printing system.

As a fortieth aspect, in the image processing device according to the thirty-ninth aspect, the halftone processing rule may be specified by a combination of a halftone algorithm and a halftone parameter.

As a forty-first aspect, in the image processing device according to the fortieth aspect, as the halftone algorithm, any one method of a dither method, an error diffusion method, and a direct binary search method may be adopted.

As a forty-second aspect, in the image processing device according to the fortieth aspect to the forty-first aspect, the halftone parameter may include at least one parameter of a threshold and a size of a dither mask in the dither method, a size of an error diffusion matrix, a diffusion coefficient, and setting of an applied gradation section of the error diffusion matrix in the error diffusion method, the number of times pixels are updated and an exchange pixel range in the direct binary search method, or a parameter for evaluating system error tolerance.

As a forty-third aspect, in the image processing device according to any one of the thirty-ninth aspect to the forty-second aspect, the printing system may include an image forming unit that includes a plurality of printing elements serving to form dots on a printing medium, and the characteristics of the printing system may be characteristics that include at least one of individual recording characteristics of the plurality of printing elements or common characteristics to the plurality of printing elements.

As a forty-forth aspect, in the image processing device according to the forty-third aspect, the recording characteristics may be characteristics that include at least one of a dot density, a dot diameter, a dot shape, a dot recording position error, or recording inexecutable abnormality.

As a forty-fifth aspect, in the image processing device according to the forty-third aspect or the forty-fourth aspect, the common characteristics may be characteristics that include at least one of an average dot density, an average dot diameter, an average dot shape, or landing interference.

As a forty-sixth aspect, in the image processing device according to any one of the thirty-ninth aspect to the forty-fifth aspect, the characteristic parameter acquisition means may include image analysis means for acquiring information related to the characteristic parameters by analyzing a read image of a characteristic parameter acquisition chart printed by the printing system.

As a forty-seventh aspect, in the image processing device according to any one of the thirty-ninth aspect to the forty-sixth aspect, the characteristic parameter acquisition means may include a user interface that allows a user to perform an input operation.

As a forty-eighth aspect, in the image processing device according to any one of the thirty-ninth aspect to the forty-seventh aspect, the plurality of requirements may include at least two items of image quality, cost, a halftone generating time, a halftone processing time, tolerance to a system error, or tolerance to environment change.

As a forty-ninth aspect, the image processing device according to any one of the thirty-ninth aspect to the forty-eighth aspect may further comprise: a priority input unit for allowing a user to input information related to priorities for the plurality of requirements.

As a fiftieth aspect, the image processing device according to any one of the thirty-ninth aspect to the forty-ninth aspect may further comprise: halftone registration means for registering the halftone processing rules generated by the halftone process generation means, as candidates of the halftone process capable of being used in the printing system.

As a fifty-first aspect, in the image processing device according to any one of the thirty-ninth aspect to the fiftieth aspect, the halftone process generation means may include previous-stage halftone process generation means for generating halftone processing rules of two or more kinds of halftone processes of which balances of priority for the plurality of requirements are different based on the characteristic parameters; and halftone automatic selection means for automatically selecting the kind of the halftone process used in the printing of the printing system from the kinds of the halftone processes defined by the two or more kinds of halftone processing rules generated by the previous-stage halftone process generation means based on the priority parameter.

As a fifty-second aspect, in the image processing device according to the fifty-first aspect, the halftone automatic selection means may include determination-evaluation-value calculation means for calculating a determination evaluation value for evaluating adequateness of the halftone process defined by the halftone processing rule generated by the previous-stage halftone process generation means based on the priority parameter, and may automatically select the kind of the halftone process used in the printing of the printing system based on the determination evaluation value calculated by the determination-evaluation-value calculation means.

The determination evaluation value may be calculated from the evaluation function including the priority parameter. The determination evaluation value may be used as the index for evaluating adequateness for the balances of the plurality of requirements set by the priority parameters. The determination evaluation value is calculated, and thus, it is possible to evaluate the performance of the halftone process of each halftone processing rule.

As a fifty-third aspect, in the image processing device according to the fifty-first aspect or the fifty-second aspect, the halftone automatic selection means may include simulation image generation means for generating a simulation image in a case where a halftone image acquired by applying the halftone process defined by the halftone processing rule generated by the previous-stage halftone process generation means is printed, and image-quality-evaluation-value calculation means for calculating an image quality evaluation value from the simulation image.

When the simulation image is generated, the simulation image on which the dot forming characteristics due to the printing system are reflected using the characteristic parameters is generated, and thus, it is possible to acquire the simulation image appropriate for the printing system.

A printing system according to a fifty-fourth aspect is a printing system comprising: the image processing device according to any one of the thirty-ninth aspect to the fifty-third aspect; and a printing device that performs printing on a printing medium based on a halftone image generated through a halftone process defined by the halftone processing rule.

A printing system according to a fifty-fifth aspect is a printing system comprising: the image processing device according to the fifty-first aspect or the fifty-second aspect; a printing device that performs printing on a printing medium based on a halftone image generated through a halftone process defined by the halftone processing rule; and halftone-selection-chart output means for outputting a halftone selection chart including quality comparison and evaluation image regions of the halftone processes by using the two or more kinds of halftone processing rules generated by the previous-stage halftone process generation means.

A printing system according to a fifty-sixth aspect is a printing system comprising: characteristic parameter acquisition means for acquiring characteristic parameters related to characteristics of a printing system; priority parameter retention means for retaining priority parameters related to priorities for a plurality of requirements required in a halftone process; halftone process generation means for generating halftone processing rules that define the processing contents of halftone processes used in the printing system based on the characteristic parameters and the priority parameters; and a printing device that performs printing on a printing medium based on a halftone image generated through the halftone process defined by the halftone processing rule.

It is possible to appropriately combine the same matters as the matters specified in the fortieth aspect to the fifty-third aspect with the printing system of the fifty-sixth aspect.

As a fifty-seventh aspect, in the printing system according to the fifty-sixth aspect, the halftone process generation means may include previous-stage halftone process generation means for generating halftone processing rules of two or more kinds of halftone processes of which balances of priority for the plurality of requirements are different based on the characteristic parameters; and halftone automatic selection means for automatically selecting the kind of the halftone process used in the printing of the printing system from the kinds of the halftone processes defined by the two or more kinds of halftone processing rules generated by the previous-stage halftone process generation means based on the priority parameter.

As a fifty-eighth aspect, the printing system according to the fifty-seventh aspect may further comprise: halftone-selection-chart output means for outputting a halftone selection chart including quality comparison and evaluation image regions of the halftone processes by using the two or more kinds of halftone processing rules generated by the previous-stage halftone process generation means.

As a fifty-ninth aspect, the printing system according to the fifty-fifth aspect or the fifty-eighth aspect may further comprise: image reading means for reading the halftone selection chart output by the halftone-selection-chart output means. The halftone automatic selection means may automatically select the kind of the halftone process based on a read image acquired by the image reading means.

The quantitative evaluation value quantitatively indicating the quality (that is, the performance of the halftone process) of the halftone image of the comparison and evaluation image region within the chart may be calculated from the read image of the halftone selection chart, and the optimum halftone may be determined based on the calculated quantitative evaluation value.

An image processing method according to a sixtieth aspect is an image processing method comprising: a characteristic parameter acquisition step of acquiring characteristic parameters related to characteristics of a printing system; a priority parameter retention step of retaining priority parameters related to priorities for a plurality of requirements required in a halftone process; and a halftone process generation step of generating halftone processing rules that define the processing contents of halftone processes used in the printing system based on the characteristic parameters and the priority parameters.

In the sixtieth aspect, it is possible to appropriately combine the same matters as the matters specified in the fortieth aspect to the fifty-ninth aspect. In this case, a processing unit or a functional unit (means) as means serving as the process or function specified in the image processing device or the printing system may be comprehended as an element of a "step" of a corresponding process or operation.

A program according to a sixty-first aspect is a program causing a computer to function as: characteristic parameter acquisition means for acquiring characteristic parameters related to characteristics of a printing system; priority parameter retention means for retaining priority parameters related to priorities for a plurality of requirements required in a halftone process; and halftone process generation means for generating halftone processing rules that define the processing contents of halftone processes used in the printing system based on the characteristic parameters and the priority parameters.

It is possible to appropriately combine the same matters as the matters specified in the fortieth aspect to the fifty-ninth aspect with the program of the sixty-first aspect. In this case, a processing unit or a functional unit (means) as means serving as the process or function specified in the image processing device or the printing system may be comprehended as an element of a program for realizing means of a corresponding process or operation.

According to the inventions described in the first aspect to the twenty-second aspect, it is possible to acquire the two or more kinds of halftone processing rules appropriate for the characteristics of the printing system. It is possible to determine the appropriate halftone process from the two or more kinds of halftone processing rules generated in this manner through the user selection or the automatic selection.

According to the inventions described in the twenty-third aspect to the thirty-eighth aspect, it is possible to determine the optimum halftone process which is appropriate for the characteristics of the printing system and satisfies the halftone performance required by the user.

According to the inventions described in the thirty-ninth aspect to the sixty-first aspect, it is possible to acquire the optimum halftone processing rule which satisfies the required halftone performance and is appropriate for the characteristics of the printing system based on the characteristic parameters related to the characteristics of the printing system and the priority parameters related to the priorities for the plurality of requirements required in the halftone process.

BRIEF DESCRIPTION OF THE DRAWINGS

FIG. 7 is an explanatory diagram of a characteristic parameter related to landing interference.

FIG. 13 is an explanatory diagram showing that the error in which a dot diameter is decreased by a predetermined amount is added to dots of pixels of a third path in a case where the drawing is performed in the drawing mode shown in FIG. 12A.

DESCRIPTION OF THE PREFERRED EMBODIMENTS

Hereinafter, embodiments of the present invention will be described in detail with reference to the accompanying drawings.

Figure 1:
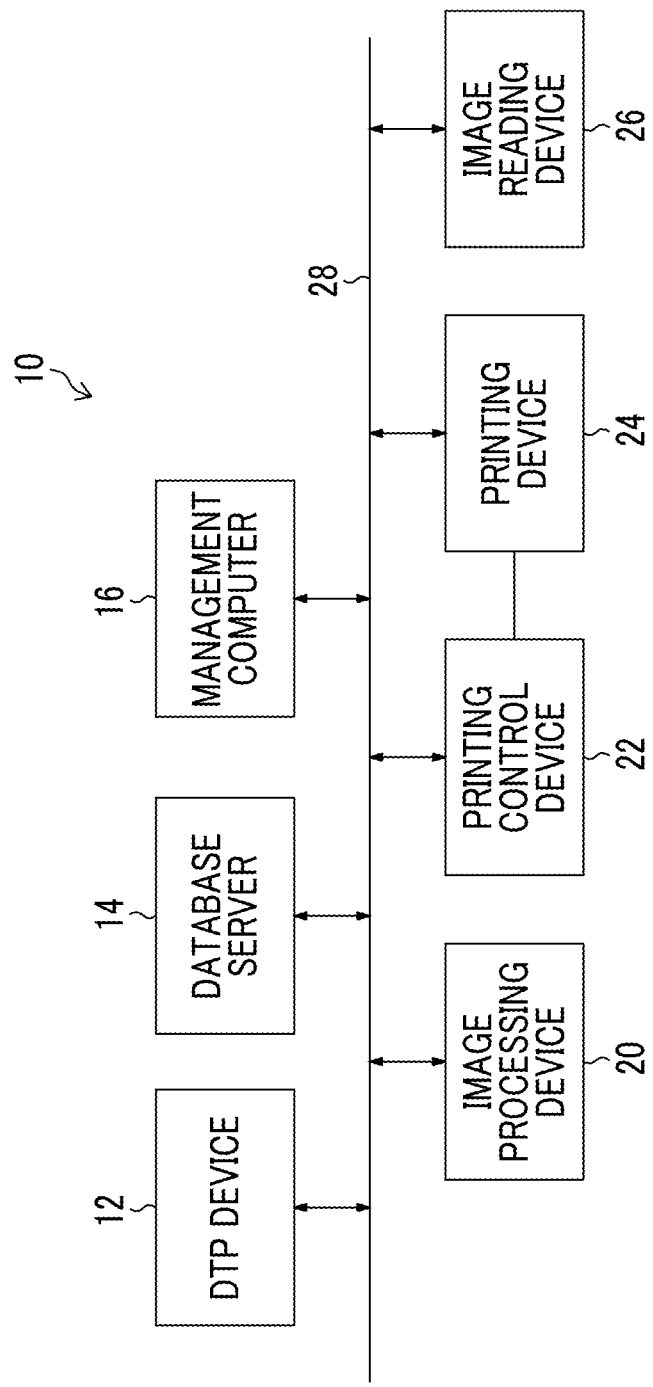
FIG. 1 is a block diagram showing a configuration example of a printing system to which an image processing device according to an embodiment of the present invention is applied.

FIG. 1 is a block diagram showing a configuration example of a printing system to which an image processing device according to an embodiment of the present invention is applied. A printing system 10 includes a desk top publishing device (DTP) 12, a database server 14, a management computer 16, an image processing device 20, a printing control device 22, a printing device 24, and an image reading device 26. The image processing device 20 is connected to the DTP device 12, the database server 14, the management computer 16, the printing control device 22 and the image reading device 26 via an electric communication line 28.

The electric communication line 28 may be a local area network (LAN), a wide area network (WAN), or may be a combination thereof. The electric communication line 28 is not limited to a wired communication line, and a part of the electric communication line or the entire electric communication line may be a wireless communication line. In the present specification, the term "connection" between devices capable of delivering a signal is not limited to a wired connection, and includes a wireless connection.

The DTP device 12 is a device that generates manuscript image data indicating the content of an image desired to be printed. The DTP device 12 is realized by combining hardware and software of a computer. The term "software" is a synonym for a program. The DTP device 12 is used to perform an operation of editing various kinds of image components such as characters, figures, patterns, illustrations and photographic images which are desired to be printed and laying the image components out on a printing surface.

The manuscript image data as print source image data is generated by the editing operation performed by the DTP device 12. The DTP device 12 generates an electronic manuscript using a page description language (PDL). The manuscript image data generated by the DTP device 12 is transmitted to the database server 14 or the image processing device 20. Means for generating the manuscript image data is not limited to an aspect in which the manuscript image data is generated by the DTP device 12, and may include an aspect in which the manuscript image data is generated by another computer or an image creating and editing device (not shown). The manuscript image data may be input to the database server 14, the image processing device 20, or the printing control device 22 via the electric communication line 28 or using a removal media (external storage medium) such as a memory card.

The database server 14 is a device that manages various data items such as a job ticket of the electronic manuscript, color sample data, target profile, and device profile appropriate for a combination of the printing device 24 and paper. For example, the job ticket may be in the form of a job definition format (JDF) file.

The management computer 16 performs various managements in the printing system 10. For example, the management computer performs an image management, a printing job management, and an operation status management of one or plurality of printing devices 24.

The image processing device 20 functions as means for performing rasterizing on the printing manuscript image data (for example, data described using a page description language) generated by the DTP device 12. The rasterizing process is called a raster image processor (RIP) process. The image processing device 20 may realize one function of a RIP device.

The image processing device 20 has a halftone processing function and a color conversion function of converting the printing manuscript image data which is a continuous-tone image into each color dot-patterned data appropriate for the output of the printing device 24. The image processing device 20 of the present example has a function of generating two or more halftone processing rules for the halftone processing function, based on characteristic parameter of the printing device 24 of the printing system 10. That is, the image processing device 20 has a halftone process generation function of generating the halftone processing rule and a halftone processing function of performing the halftone process on the continuous-tone image using the generated halftone processing rules. The image processing device 20 may be realized by combining the hardware and the software of the computer.

The halftone processing rule is a processing rule for performing the halftone process of converting data of the continuous-tone image into data of a halftone image which is the dot-patterned data. The halftone processing rule is defined by a combination of a halftone algorithm and a halftone parameter. The halftone processing rule means a specific calculation mechanism of the halftone process, and specifies the content of the halftone process.

For example, as the kind of the halftone algorithm, there are a dither method, an error diffusion method, and a direct binary search method. The halftone parameter is a specific parameter used in a calculation process according to the halftone algorithm. The halftone parameter is determined for each halftone algorithm. For example, as the halftone parameter in the dither method, a size and a threshold of a dither matrix are determined. As the halftone parameter in the error diffusion method, there are a matrix size of an error diffusion matrix, an error diffusion coefficient, and setting of an applied gradation section of each error diffusion matrix. As the halftone parameter in the direct binary search method, there are a pixel update number indicating the number of times a process of replacing (exchanging) pixels is performed, and an exchange pixel range indicating a pixel range in which the pixels are replaced. A parameter for evaluating tolerance to a system error may be added to the halftone parameter in each halftone algorithm. When the halftone processing rule is generated, at least one parameter of the plurality of parameters described above is specified as the halftone parameter.

The specific content of the processing function of the image processing device 20 will be described below. The data of the halftone image generated by the image processing device 20 is supplied to the printing control device 22, and thus, a target image is printed by the printing device 24.

The printing control device 22 controls a printing operation performed the printing device 24 based on the print image data generated by the image processing device 20. The printing device 24 is image forming means for printing the image data according to the control of the printing control device 22. A printing method or the kind of color material to be used in the printing device 24 is not particularly limited. For example, as the printing device 24, various kinds of printing devices such as an ink jet printing machine, an electrophotographic printer, a laser printer, an offset printing machine and a flexographic printing machine may be adopted. The term "printing device" is understood as a synonym for a printing machine, a printer, an image recording device, an image forming device and an image output device. As the color material, ink or toner may be used depending on the kind of the printing device 24.

Here, an example in which an ink jet printing machine which is an example of a non-plate type digital printing machine is used as the printing device 24 will be described. In the printing system 10 according to the present embodiment, an ink jet printing machine capable of forming a color image using four color inks of cyan (C), magenta (M), yellow (Y) and black (K) is used as an example of the printing device 24. However, the number of colors of the inks or a combination thereof is not limited to this example. For example, in addition to four colors of CMYK, an aspect in which light color inks such as light cyan (LC) and light magenta (LM) are added, or an aspect in which special color inks such as red and green are used may be applied.

Although an aspect in which the printing control device 22 and the printing device 24 are depicted as separate blocks and a signal is delivered between these devices through the wired or wireless communication connection has been shown in FIG. 1, the present embodiment is not limited to such a configuration, and a printing device in which the printing control device 22 and the printing device 24 are integrally combined may be used.

In a case where a plate type printing machine using a printing plate is adopted as the printing device 24, the printing system includes a plate making device (not shown) such as a plate recorder that makes a printing plate from the image data in addition to the printing control device 22. In this case, the plate making device such as the plate recorder, a controller thereof, and a printing machine that prints the image data using the printing plate made by the plate making device are connected to the electric communication line 28. In a case where the plate type printing machine is used, the configuration in which the printing control device 22, the plate making device (not shown) and the printing device 24 are combined can be comprehended as the "printing device" as a whole. The printing device 24 corresponds to one example of an "image forming unit".

The image reading device 26 is means for reading an image of a printed material printed by the printing device 24 and generating electronic image data indicating the read image. The image reading device 26 includes an imaging element (photoelectric conversion element) that images the image of the printed material and converts the imaged image information into an electric signal, and a signal processing circuit that processes the signal acquired from the image element and generates digital image data.

As the image reading device 26, a separate scanner (for example, a flatbed scanner, that is, an office scanner capable of being used online) from the printing device 24 may be used. The image reading device 26 may be combined with the printing device 24. For example, line sensors (image units) for reading the image may be provided in a paper transport path of the printing device 24, and a print image may be read by the line sensors while transporting the printed material on which the image has formed. The line sensor for reading the image which is provided in the paper transport path in the printing device 24 is referred to as the term "inline scanner" or "inline sensor" in some cases. The image reading device 26 corresponds to one example of "image reading means".

The read image data of the print image generated by the image reading device 26 is input to the image processing device 20. The image processing device 20 has a function of analyzing the read image data acquired from the image reading device 26.

<Variation of System Configuration>

The functions of the DTP device 12, the database server 14, the management computer 16, the image processing device 20 and the printing control device 22 may be realized by one computer, or may be realized by a plurality of computers. The roles and functions of the respective computers may be shared in various forms. For example, the functions of the DTP device 12 and the image processing device 20 may be realized by one computer, or the function of the image processing device 20 may be offered within the management computer 16. The function of the image processing device 20 and the function of the printing control device 22 may be realized by one computer. The function of the image processing device 20 may be shared and realized by a plurality of computers.

The numbers of DTP devices 12, database servers 14, management computers 16, image processing devices 20, printing control devices 22, printing devices 24, image reading devices 26 and plate making devices which are included in the present system are not particularly limited.

A network system in which the DTP device 12, the database server 14, the management computer 16, the image processing device 20 and the printing control device 22 are connected to the electric communication line 28 has been described in the present example. However, when the present invention is implemented, the respective elements may not be necessarily connected to the communication network.

<Hardware Configuration of Image Processing Device 20>

Figure 2:
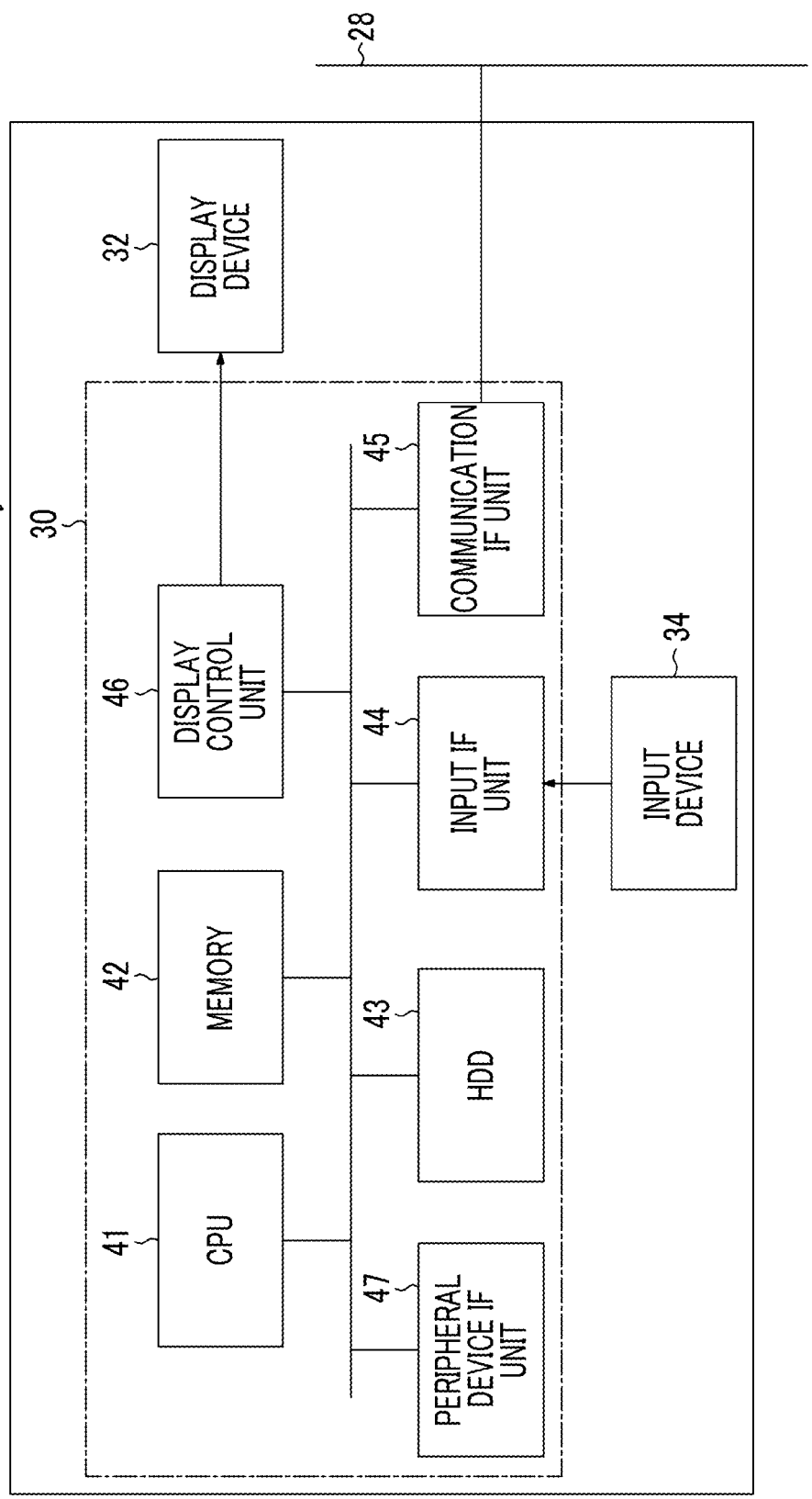
FIG. 2 is a block diagram showing a hardware configuration example of an image processing device.

FIG. 2 is a block diagram showing a hardware configuration example of the image processing device 20. The image processing device 20 of the present example is realized using a personal computer (PC). That is, the image processing device 20 includes a PC main body 30, a display device 32, and an input device 34. The term "PC" means a personal computer, and includes various types of computers such as a desktop computer, a laptop computer and a tablet computer. The PC main body 30 includes a central processing unit (CPU) 41, a memory 42, a hard disk drive (HDD) 43 as a storage device that stores and retains various programs or data items, an input interface unit 44, a communication interface unit 45 for network connection, a display control unit 46, and a peripheral device interface unit 47.

The image reading device 26 described in FIG. 1 may be connected to the image processing device 20 through the peripheral device interface unit 47 of FIG. 2.

For example, as the display device 32, a liquid crystal display or an organic electro-luminescence (EL) display may be used. The display device 32 is connected to the display control unit 46. The input device 34 may adopt various means such as a keyboard, a mouse, a touch panel and a trackball, and may be an appropriate combination thereof. In the present example, as the input device 34, a keyboard and a mouse are used. The input device 34 is connected to the input interface unit 44. The display device 32 and the input device 34 function as a user interface (UI). An operator (user) may input various information items by using the input device 34 while viewing the content displayed on a screen of the display device 32, and may operate the image processing device 20 or the printing device 24. The operator can comprehend (check) a system state through the display device 32.

Various programs or data items required for the image processing are stored in the hard disk drive 43. For example, chart data of a characteristic parameter acquisition chart, a calculation program for generating a characteristic parameter, an image processing program including a process of generating the halftone processing rule, and a program of generating a halftone selection chart are stored. The programs stored in the hard disk drive 43 are loaded to the memory 42, and the loaded programs are executed by the CPU 41. Thus, various means defined by the programs are functioned.

The same hardware configurations as those of the PC main body 30, the display device 32 and the input device 34 shown in FIG. 2 may be adopted as the hardware configurations of the DTP device 12, the database server 14, the management computer 16 and the printing control device 22 described in FIG. 1.

<Description Related to Function of Image Processing Device 20>

Figure 3:
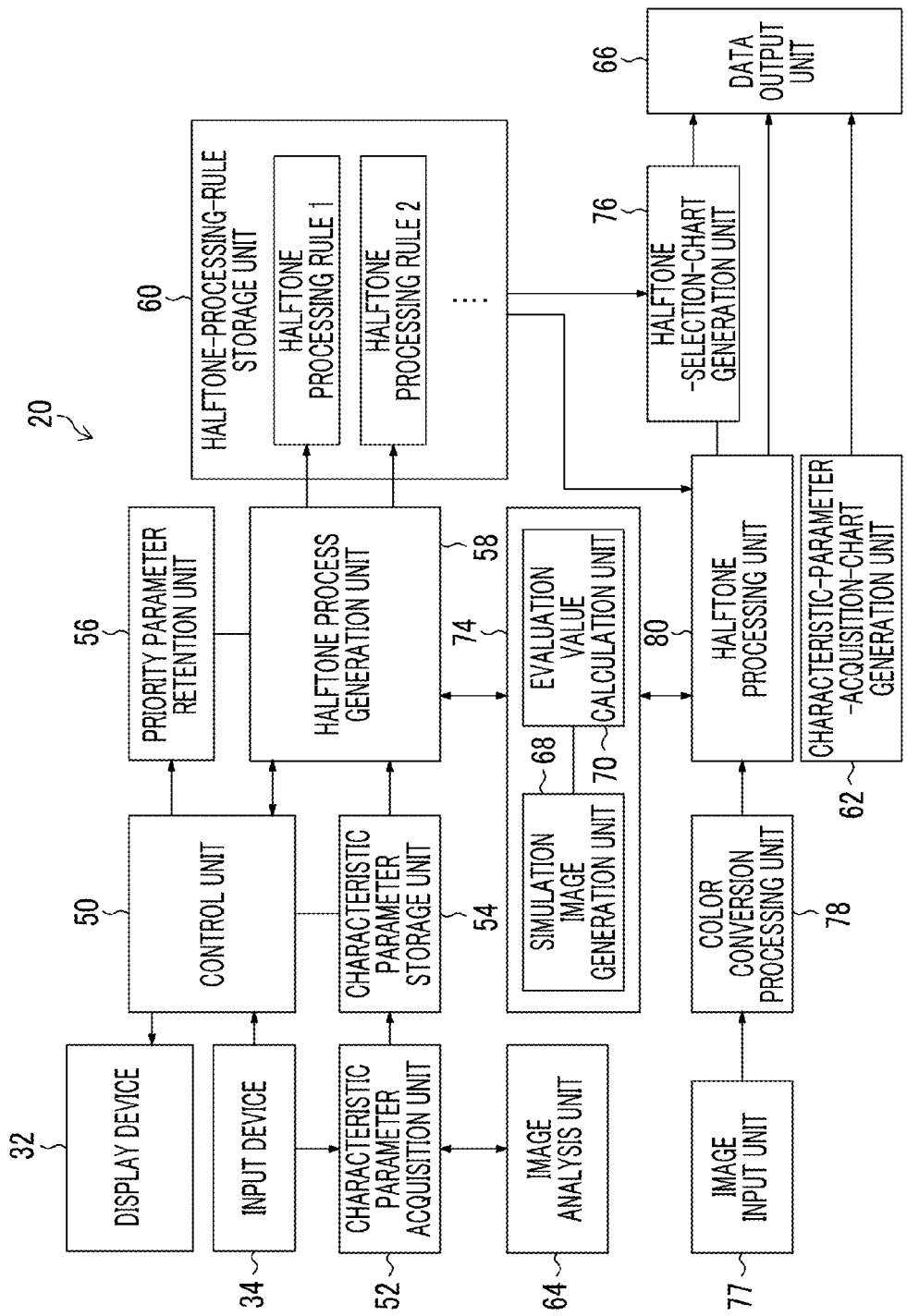
FIG. 3 is a block diagram for describing a function of the image processing device.

FIG. 3 is a block diagram for describing a function of an image processing device 20 according to the present embodiment. The image processing device 20 includes a control unit 50, a characteristic parameter acquisition unit 52, a characteristic parameter storage unit 54, a priority parameter retention unit 56, a halftone process generation unit 58, and a halftone-processing-rule storage unit 60.

The control unit 50 controls the operations of the respective units of the image processing device 20. The characteristic parameter acquisition unit 52 is means for acquiring a characteristic parameter related to the characteristics of the printing system 10 including the printing device 24 described in FIG. 1. For example, as the characteristic parameter related to the characteristics of the printing system, there are resolution, the number of nozzles, an ink kind, an average dot density, an average dot diameter, an average dot shape, and a dot density, a dot diameter, a dot shape, jetting bending, non-jetting of each printing element, and landing interference of each printing element. Information related to at least one of the parameters described herein, preferably, information related to the plurality of parameters is acquired through the characteristic parameter acquisition unit 52. The characteristic parameter acquisition unit 52 corresponds to one example of "characteristic parameter acquisition means".

The printing element means a recording element serving to record the dot in the printing device 24. In the case of an ink jet printing device, a nozzle for jetting an ink in an ink jet head corresponds to the "printing element". In the case of a printing device using a relief plate, a relief of a protrusion portion of a halftone dot in the plate corresponds to the "printing element".

The characteristics of the printing system include at least one of individual recording characteristics of a plurality of printing elements or common characteristics of the plurality of printing elements. The individual recording characteristics of the printing elements include at least one of a dot density, a dot diameter, a dot shape, a dot recording position error, or unrecordable abnormality. In the ink jet printing device, the dot recording position error corresponds to the "jetting bending", and the unrecordable abnormality corresponds to the "non-jetting".

The "common characteristics" of the plurality of printing elements include at least one of an average dot density, an average dot diameter, an average dot shape, or landing interference.

A method of acquiring the characteristic parameter may be performed by allowing the user to input the respective parameters through the user interface, or may be performed by causing the printing device 24 to output the characteristic parameter acquisition chart and by causing the image reading device 26 (see FIG. 1) such as the inline scanner or the office scanner to read the characteristic parameter acquisition chart and to analyze the read image.

Among the resolution, the number of nozzles, the ink kind, the average dot density, the average dot diameter, the average dot shape, and the dot density, the dot diameter, the dot shape, the jetting bending, the non-jetting and the landing interference of each printing element, the resolution, the number of nozzles and the kind of the ink are characteristic parameters related to the system specification.

Accordingly, it is preferable that the characteristic parameters related to the system specifications are previously retained within the system. It is preferable that data of the characteristic parameter acquisition chart for acquiring the parameters related to the individual characteristics of the system is generated based on the resolution, the number of nozzles or the ink kind which is the characteristic parameter related to the system specification, the characteristic parameter acquisition chart is output by the printing device 24 of the printing system 10, the characteristic parameter acquisition chart is read from the image reading device 26 (see FIG. 1) and various characteristic parameters related to the characteristics specific to the printing device 24 are acquired.

That is, among the various characteristic parameters described above, the parameters of the dot density, the dot diameter, the dot shape and the landing interference of each printing element are changed depending on the combination of the ink or the printing medium to be used and the characteristics of the recording head, and the jetting bending or the non-jetting is changed by the state of the recording head. The characteristics of the recording head include a waveform or a frequency of a driving signal applied to the recording head when the ink is jetted, and the state of the recording head includes, for example, the inclining or bending of the recording head and indicates a distance from the printing medium or a state of each printing element. As mentioned above, it is necessary to adaptively set the combination of the ink or the printing medium to be used and the recording head and various parameters depending on the state of the recording head to be appropriate values. However, it is assumed that if the user inputs the appropriate values to various parameters, the operation load is excessive.

Accordingly, in order to reduce an operation load of the user related to the acquisition of the characteristic parameters, it is preferable that the characteristic parameter acquisition chart is output, the chart outputting result is read, and various characteristic parameters are automatically acquired.

The image processing device 20 of the present example includes a characteristic-parameter-acquisition-chart generation unit 62 and an image analysis unit 64, as means for automatically acquiring the characteristic parameters related to the characteristics of the printing system 10.

The characteristic-parameter-acquisition-chart generation unit 62 is a processing unit that generates chart data of the characteristic parameters related to the characteristics of the printing system. The chart data generated by the characteristic-parameter-acquisition-chart generation unit 62 is sent to the printing control device 22 (see FIG. 1) through the data output unit 66, and the characteristic parameter acquisition chart is printed by the printing device 24.

The combination of the characteristic-parameter-acquisition-chart generation unit 62 and the configuration in which the characteristic parameter acquisition chart is output by the printing device 24 (see FIG. 1) based on the chart data generated by the characteristic-parameter-acquisition-chart generation unit 62 corresponds to one example of "characteristic-parameter-acquisition-chart output means".

An example of the characteristic parameter acquisition chart will be described below in detail, but a single dot pattern of each printing element by a head of each color of the ink may be the characteristic parameter acquisition chart. The single dot pattern is a pattern which is obtained by isolating each dot from another dot without overlapping another dot and individually jetting dots. The chart of the single dot pattern is read, and thus, the parameters related to the dot density, dot diameter, dot shape, jetting bending and non-jetting of each printing element can be read.

The characteristic parameter acquisition chart may include a continuous dot pattern in which a plurality of dots overlaps in addition to the single dot pattern. The continuous dot pattern may include a continuous dot pattern in which an inter-dot distance between two dots is changed and the dots are jetted such that a part of each dot overlaps a part of another dot. Such a continuous dot pattern is used to acquire a parameter of a dot deformation amount due to landing interference.

In a case where there the droplet kind of the present printing system 10 is one, a single dot pattern may be formed by independently jetting one kind of dot, and a continuous dot pattern may be formed by jetting a plurality of dots so as to overlap each other. In a case where the droplet kind of the present printing system is plural, a single dot pattern may be formed by independently jetting the respective kinds of dots, and a continuous dot pattern may be formed by jetting a combination of the respective kinds of dots so as to overlap each other.

When the characteristic parameter acquisition chart is output, a single dot of the same printing element may be printed multiple times, and the average values of the dot densities, the dot diameters, the dot shapes and the jetting bending thereof may be the dot density, the dot diameter, the dot shape and the jetting bending of the printing element. An average dot density, an average dot diameter and an average dot shape may be acquired by averaging the dot densities, the dot diameters and the dot shapes of the respective printing elements.

In a case where a tolerance deign to the system error is performed, a variance $\sigma^2$ indicating a variation in an average value of measurement values acquired by reading the characteristic parameter acquisition chart may be calculated, and a value of a standard deviation $\sigma$ which is the square root of the variation $\sigma^2$ may be used as a predetermined amount of an error to be used later.

A printing result of the characteristic parameter acquisition chart printed by the printing device 24 is read by the image reading device 26, and the data of the read image of the characteristic parameter acquisition chart is acquired.

The image analysis unit 64 functions as a characteristic parameter generation unit that analyzes the read image read by the image reading device 26 and generates information of the characteristic parameter. The information of the characteristic parameter is automatically acquired from the characteristic parameter acquisition chart by the image analysis unit 64. The image analysis unit 64 corresponds to one example of "image analysis means".

In the image processing device 20 of the present example, the user may directly input the characteristic parameters related to the characteristics of the printing system 10 by using the input device 34. That is, as the aspect of the characteristic parameter acquisition unit 52 of the image processing device 20, the user may directly input the characteristic parameters related to the characteristics of the printing system 10 by using the input device 34, the characteristic parameters may be automatically acquired from the measuring result of the characteristic parameter acquisition chart, or a combination thereof may be used.

The information of the characteristic parameter acquired through the characteristic parameter acquisition unit 52 is stored in the characteristic parameter storage unit 54. The characteristic parameters related to the system specification may be previously stored in the characteristic parameter storage unit 54.

The halftone process generation unit 58 generates the halftone processing rule that defines the processing content of each of two or more kinds of halftone processes of which the balances of priority for a plurality of requirements required in the halftone process are different based on the characteristic parameters. The image processing device 20 includes an image quality evaluation processing unit 74 that includes a simulation image generation unit 68 and an evaluation value calculation unit 70, and the halftone process generation unit 58 generates the two or more kinds of halftone processing rules in cooperation with the image quality evaluation processing unit 74. The halftone process generation unit 58 corresponds to one example of "halftone process generation means". The evaluation value calculation unit 70 corresponds to one example of "evaluation value calculation means".

The image quality evaluation processing unit 74 performs an optimum searching process in which an evaluation value is enhanced while repeatedly performing the generation of the simulation image and the calculation of the evaluation value of the image quality for the simulation image. The halftone parameter is determined through the process performed by the image quality evaluation processing unit 74.

The multiple kinds of halftone processing rules generated by the halftone process generation unit 58 are registered in the halftone-processing-rule storage unit 60. For the sake of convenience in the illustration, it has been described in FIG. 3 that two kinds of different halftone processing rules 1 and 2 are generated and the halftone processing rules 1 and 2 are stored and retained in the halftone-processing-rule storage unit 60. However, in a case where K is an integer which is equal to or greater than 2, K or more kinds, that is, multiple kinds of halftone processing rules may be generated. All or a part of the K kinds of generated halftone processing rules 1, 2, . . . , and K may be registered as a line-up in the halftone-processing-rule storage unit 60. The halftone-processing-rule storage unit 60 corresponds to one example of "halftone registration means". Multiple kinds of halftone processing rules as candidates of the halftone process capable of being used in the printing system 10 may be registered in the halftone-processing-rule storage unit 60.

The halftone processing rule actually used in the printing is determined among the plurality of halftone processing rules generated in the halftone process generation unit 58.

The image processing device 20 of the present example includes a halftone-selection-chart generation unit 76 as selection supporting means for selecting any one halftone processing rule of the plurality of halftone processing rules.

The halftone-selection-chart generation unit 76 generates chart data of the halftone selection chart in which the printing results of the halftone images acquired by two or more kinds of halftone processing rules are arranged so as to be compared. The chart data generated by the halftone-selection-chart generation unit 76 is sent to the printing control device 22 (see FIG. 1) through the data output unit 66, and the halftone selection chart is printed by the printing device 24. The combination of the halftone-selection-chart generation unit 76 and the printing device 24 corresponds to one example of "halftone-selection-chart output means". The halftone-selection-chart generation unit 76 corresponds to one example of "halftone-selection-chart generation means".

A user can select a desired halftone processing rule while viewing the output result of the halftone selection chart. A selection operation of the halftone processing rule performed by the user is performed using the input device 34. The input device 34 functions as "halftone selection operating means" for allowing the user to perform the selection operation of the desired halftone processing rule. That is, the input device 34 functions as halftone selection operating means for receiving a user operation for allowing the user to select the kind of any one halftone process from the two or more kinds of halftone processes.

The input device is not limited to the function of selecting the halftone processing rule by the user, and may have a function of allowing the system to automatically select one halftone processing rule. In this case, it is necessary to previously retain priority parameters related to the priorities for the plurality of requirements in the halftone process. Priority parameters that designate the balances of priority related to the plurality of requirements are stored in the priority parameter retention unit 56. The priority parameter retention unit 56 corresponds to one example of "priority parameter retention means".

The priority parameter may be freely input by the user through the input device 34. The balances of priority may be set and the setting content may be changed. Alternatively, as the priority parameter, one kind or multiple kinds of selection candidates may be previously prepared on the system. In a case where multiple kinds of selection candidates related to the setting of the priority parameter are prepared, the user can select any one selection candidate through the input device 34 in consideration of the printing purpose or usage and productivity.

The balances of priority for the requirements may be designated by the priority parameter, and thus, one optimum halftone processing rule recommended on the system may be uniquely determined according to the priority parameter specified by the priority parameter retention unit 56. The automatic selection function may be realized by the control unit 50, and the configuration of the control unit 50 serving to perform the automatic selection process corresponds to one example of "halftone automatic selection means".

The input device 34 functions as a priority input unit for allowing the user to input a setting related to the priority for each requirement. The halftone processing rule (that is, a combination of the halftone algorithm and the halftone parameter) based on the setting of the priority and the halftone processing rule which is the balance of the priority symmetrical with the balances of priority related to the user setting may be generated depending on the priority set by the user, and these halftone processing rules may be compared.

The balance of the priority may be slightly adjusted with the priority set by the user as its reference, and the plurality of halftone processing rules may be generated based on the plurality of set balances of the priority.

The image processing device 20 has a function of performing the halftone process on the data of the continuous-tone image according to the generated halftone processing rule. That is, the image processing device 20 includes an image input unit 77, a color conversion processing unit 78, and a halftone processing unit 80.

The image input unit 77 is an input interface unit that inputs the data of the manuscript image, and functions as an image data acquisition unit. The image input unit 77 may be a data input terminal that inputs the manuscript image data from another signal processing unit outside or inside the device. As the image input unit 77, a wired or wireless communication interface unit may be adopted, a media interface unit that performing reading and writing on an external storage medium (removable disk) such as a memory card may be adopted, or an appropriate combination thereof may be adopted.

The color conversion processing unit 78 performs the color converting process on the manuscript image data by using color profile in accordance with the form of ICC profile by the International Color Consortium (ICC), and generates a color image signal appropriate for outputting performed by the printing device 24. In a case where four color inks of CMYK are used in the printing device 24, image signals of CMYK are generated by the color conversion processing unit 78. In addition to CMYK, in a case where six color inks which include light magenta (LM) and light cyan (LC) are used, image signals which include the respective color components of CMYK, LM and LC are generated by the color conversion processing unit 78.

The halftone processing unit 80 performs the halftone process on the continuous-tone images of the respective colors by using the halftone processing rule generated by the halftone process generation unit 58, and generates the halftone image. The data of the halftone image generated by the halftone processing unit 80 is sent to the printing control device 22 (see FIG. 1) through the data output unit 66, and the printing is performed by the printing device 24.

The image quality evaluation processing unit 74 of the image processing device 20 may calculate the evaluation value of the printing halftone image in cooperation with the halftone processing unit 80. Information of the evaluation value related to the halftone image generated by the halftone processing unit 80 may be displayed on the screen of the display device 32, and may be supplied to the outside through the data output unit 66.

<Procedure of Determining Halftone Processing Rule in Printing System>

Figure 4:
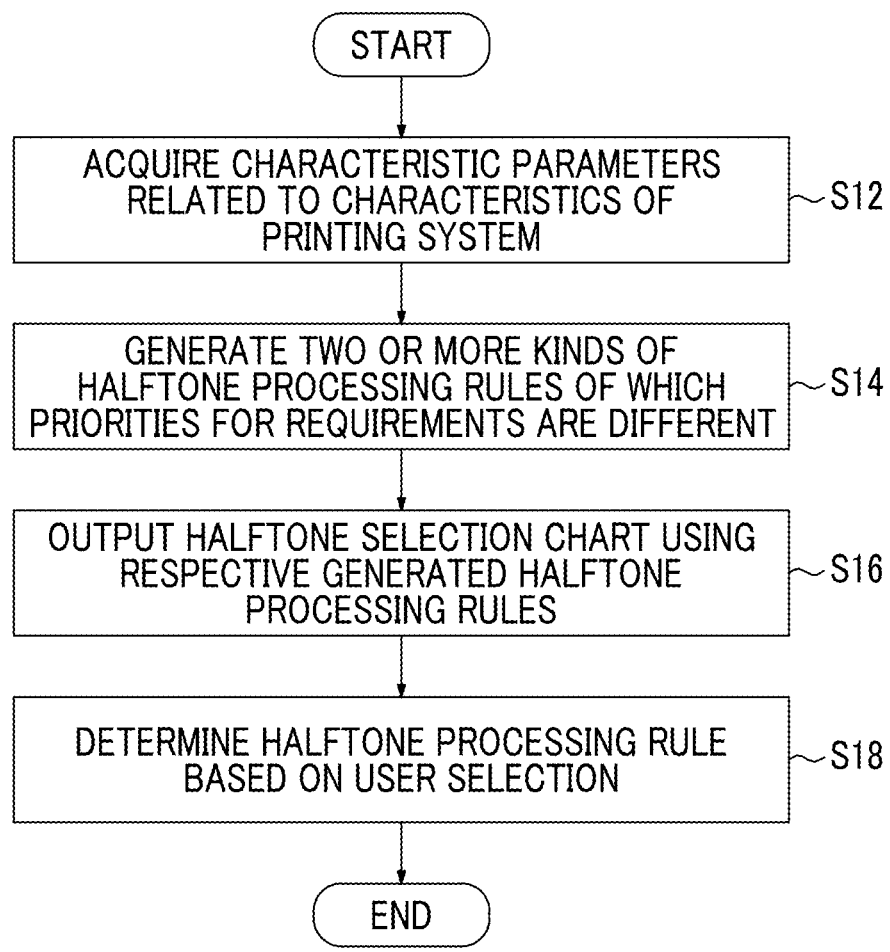
FIG. 4 is a flowchart showing an example of a method of determining a halftone processing rule according to the present embodiment.

A method of determining the halftone processing rule in the printing system 10 according to the present embodiment will be described in detail. FIG. 4 is a flowchart showing an example of a method of determining a halftone processing rule which is an image processing method according to the present embodiment. That is, FIG. 4 is a flowchart showing an example of a method of determining a halftone processing rule according to a halftone process determination method according to the present embodiment.

Initially, the characteristic parameters related to the characteristics of the printing system are acquired (step S12). When the characteristic parameters are acquired, the input using the user interface may be performed, but it is preferable that the characteristic parameters are automatically acquired by analyzing the read image of the characteristic parameter acquisition chart. Step S12 corresponds to one example of a "characteristic parameter acquisition step".

Subsequently, the two or more kinds of halftone processing rules of which the priorities for the requirements of the halftone process are different are generated (step S14). When the halftone processing rule is generated, multiple kinds of halftone processing rules are generated based on the priority parameter and the characteristic parameter. Step S14 is one example of a "halftone process generation step".

The halftone selection chart is output using the respective generated halftone processing rules (step S16). Steps S16 is one example of a "halftone-selection-chart output step".

The user can select any one halftone processing rule while viewing the output result of the halftone selection chart. The halftone processing rule used in the printing is determined based on the selection operation of the user (step S18). That is, in step S18, the user operation for allowing the user to select the kind of any one halftone process from the two or more kinds of halftone processes used to generate the halftone selection chart is received, and the halftone processing rule is determined based on the selection operation by the user. Step S18 is one example of a "halftone process selection step", and step S18 is one example of a "halftone selection operating step".

<Example of Characteristic Parameter Acquisition Chart>

A specific example of the characteristic parameter acquisition chart used in the characteristic parameter acquisition step described in step S12 of FIG. 4 will be described.

Figure 5:
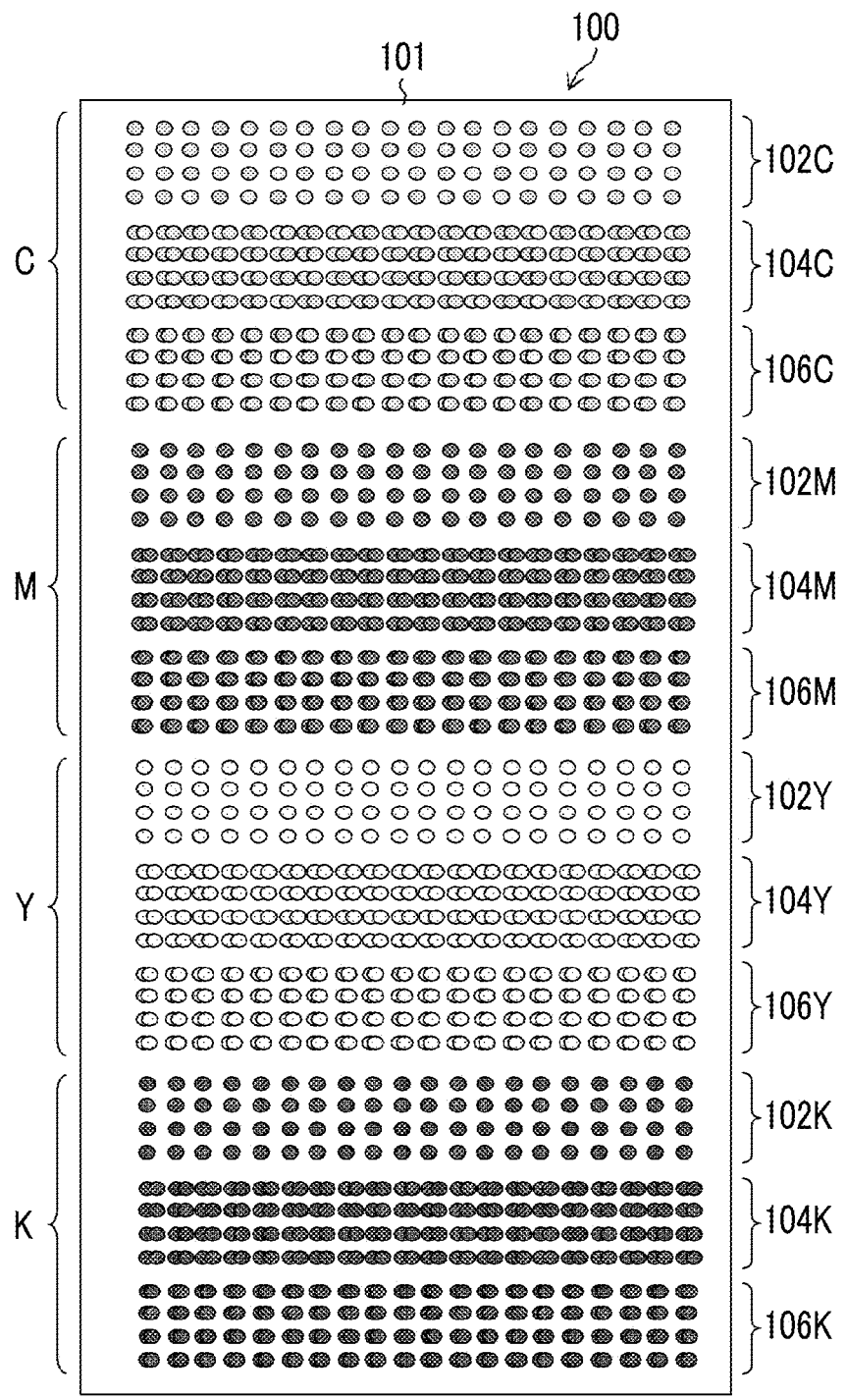
FIG. 5 is a diagram showing an example of a characteristic parameter acquisition chart.

FIG. 5 is a diagram showing an example of a characteristic parameter acquisition chart 100. Here, an example in which single dot patterns 102C, 102M, 102Y and 102K, first continuous dot patterns 104C, 104M, 104Y and 104K and second continuous dot patterns 106C, 106M, 106Y and 106K on a printing medium 101 are jetted by the nozzles which are the printing elements in the recording heads of the respective colors of cyan, magenta, yellow and black is illustrated. The single dot patterns 102C, 102M, 102Y and 102K are discrete dot patterns in which dots are discretely recorded in an isolation state in which the single dot is isolated from another dot. The first continuous dot patterns 104C, 104M, 104Y and 104K and the second continuous dot patterns 106C, 106M, 106Y and 106K are continuous dot patterns in which two or more dots are recorded so as to be in contact.

Figure 6:
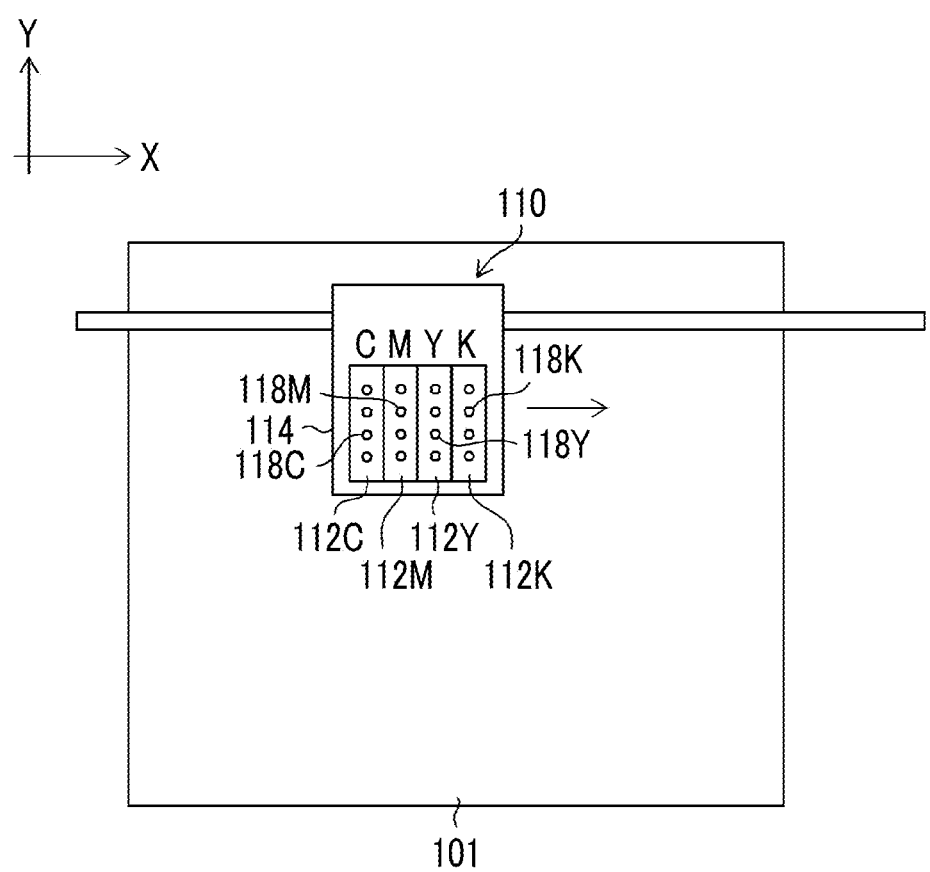
FIG. 6 is a schematic plan view of a serial scan type ink jet printing device used to draw the characteristic parameter acquisition chart of FIG. 5.

FIG. 6 is a schematic plan view of a serial scan type ink jet printing device used to draw the characteristic parameter acquisition chart of FIG. 5. In FIG. 6, for the sake of convenience in the illustration, only four nozzles of the respective colors are illustrated by reducing the number of nozzles of the recording heads of the respective colors. The number of nozzles, the arrangement form of nozzles, and the nozzle density may be variously designed.

As shown in FIG. 6, a head unit 110 of the serial scan type ink jet printing device is configured such that a cyan recording head 112C that jets an cyan ink, a magenta recording head 112M that jets a magenta ink, an yellow recording head 112Y that jets a yellow ink and a black recording head 112K that jets a black ink are mounted on a carriage 114 and can be moved in reciprocating motion in an X direction of FIG. 6. A Y direction perpendicular to the X direction is a transport direction of the printing medium 101. The X direction corresponds to a "main scanning direction", and the Y direction corresponds to a "sub scanning direction". As means (medium transport means) for transporting the printing medium 101, various forms such as a drum transport type, a belt transport type, a nip transport type a chain transport type and a pallet transport type may be adopted, and these types may be appropriately combined.

The detailed structure of the respective recording heads of the cyan recording head 112C, the magenta recording head 112M, the yellow recording head 112Y and the black recording head 112K are not shown. However, each of the ink jet type recording heads includes jetting energy generating elements (for example, piezoelectric elements or heat generating elements) that generate jetting energy required to jet the inks depending on the respective nozzles. The respective recording heads (112C, 112M, 112Y and 112K) jet ink liquid droplets on demand in response to driving signals and jetting control signals applied from the printing control device 22 (see FIG. 1).

The droplets are jetted from the respective nozzles 118C of the cyan recording head 112C in an appropriate timing while moving the carriage 114 of FIG. 6 in the X direction, and thus, the single dot pattern denoted by reference numeral 102C of FIG. 5 can be formed. After the single dot pattern 102C is drawn using the cyan ink, a recording region in the printing medium 101 is changed by transporting the printing medium 101 in the Y direction, and the droplets are jetted from the respective nozzles 118C of the cyan recording head 112C in an appropriate timing while moving the carriage 114 in the X direction. Thus, the first continuous dot pattern denoted by reference numeral 104C of FIG. 5 can be formed. After the first continuous dot pattern 104C is drawn using the cyan ink, the recording region in the printing medium 101 is changed by transporting the printing medium 101 in the Y direction, and the droplets are jetted from the respective nozzles 118C of the cyan recording head 112C in an appropriate timing while moving the carriage 114 in the X direction. Thus, the second continuous dot pattern denoted by reference numeral 106C of FIG. 5 can be formed.

In the first continuous dot pattern 104C and the second continuous dot pattern 106C, the inter-dot distances between the dots overlapping each other are differently set. Multiple kinds of continuous dot patterns are recorded by changing the inter-dot distances, and thus, the characteristic parameter related to the relationship between an inter-dot distance d and the deformation amount due to the influence of the landing interference can be comprehended.

Although it has been described in FIG. 5 that two kinds of continuous dot patterns (104C and 106C) in which the inter-dot distances are different are used, three or more kinds of continuous dot patterns may be formed by changing the inter-dot distances.

Subsequently to the recording of the dot patterns (102C, 104C and 106C) using the cyan ink, the droplets from the respective nozzles 118M of the magenta recording head 112M, the droplets from the respective nozzles 118Y of the yellow recording head 112Y, and the droplets from the respective nozzles 118K of the black recording head 112K are sequentially jetted in a similar manner. Thus, the characteristic parameter acquisition chart 100 shown in FIG. 5 is generated.

Information items related to the dot density, the dot diameter, the dot shape, the dot jetting bending and the non-jetting of each printing element of each color may be acquired from each of the single dot patterns 102C, 102M, 102Y and 102K of the respective colors. A statistical process is performed on the measurement results of a plurality of single dots, and thus, it is possible to acquire the average dot density, the average dot diameter, the average dot shape and the standard deviation $\sigma$ (square root of the variation $\sigma^2$) thereof. The standard deviation $\sigma$ or the variance $\sigma^2$ calculated for at least one item of the dot density, the dot diameter, the dot shape and the jetting bending of each printing element corresponds to one example of "dispersion information related to dispersion of dot". The amount (corresponds to the "predetermined amount of added errors" to be described below) of errors added in the calculation when the tolerance design to the instability of the system may be determined based on the dispersion information.

Information of the characteristic parameter related to the landing interference can be acquired from the first continuous dot patterns 104C, 104M, 104Y and 104K and the second continuous dot patterns 106C, 106M, 106Y and 106K of the respective colors. The characteristic parameter related to the landing interference refers to information related to a change in inter-dot distance, a change in dot density or a change in dot shape due to the influence of the landing interference which is the interaction between the dots overlapping each other.

<Characteristic Parameter Related to Landing Interference>

Figures 8, 9:
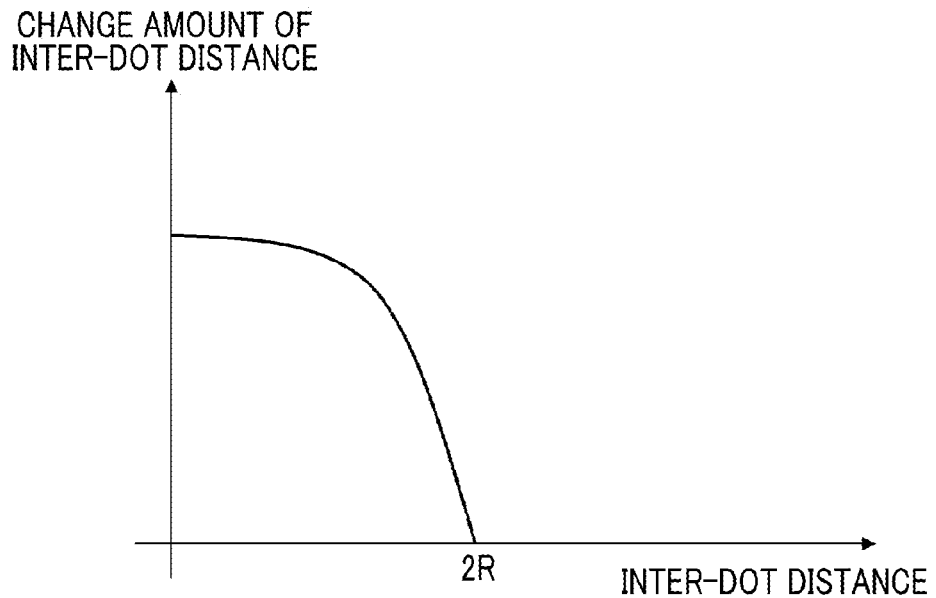
FIG. 8 is a diagram showing a landing interference parameter expressed by a function of an inter-dot distance.
FIG. 9 is a table showing the advantages and disadvantages of various halftone algorithms for a plurality of requirements.

FIGS. 7 and 8 are explanatory diagrams of the characteristic parameter related to the landing interference. The left fields of FIG. 7 represent that the set value of the inter-dot distance between two dots when two dots are continuously jetted by partially overlapping the two dots is differently set in three steps of d1, d2 and d3, and the right fields of FIG. 7 represent that the inter-dot distance is changed due to the influence of the landing interference in a case where the droplets are jetted in the set values of the inter-dot distances d1, d2 and d3. The inter-dot distance means a distance between the centers of the dots.

As shown in the drawings, it is assumed that actual inter-dot distances are u1, u2 and u3 (u1>u2>u3) for the inter-dot distances d1, d2 and d3 (d1>d2>d3) as the set values. Since the dots are drawn due to the landing interference, the relationships of d1>u1, d2>u2, and d3>u3 are satisfied.

The data of the change in the inter-dot distance due to the influence of the landing interference is acquired by changing the setting of the inter-dot distance, and thus, it is possible to acquire landing interference data shown in FIG. 8. A horizontal axis of FIG. 8 denotes a set value of the inter-dot distance, and "R" represents a radius of the dot. A vertical axis of FIG. 8 denotes the change amount by which the inter-dot distance is changed due to the influence of the landing interference, and represents an absolute value of |di−ui| of FIG. 7 (i=1, 2 and 3). "2R" on the horizontal axis of FIG. 8 represents a position in which two dots are circumscribed. If the inter-dot distance is greater than 2R, since the dots do not overlap each other, there is no influence of the landing interference. In a case where the inter-dot distance is set to be smaller than 2R, the dots overlap each other, and the dots are drawn due to the landing interference. Thus, the inter-dot distance is changed.

Although it has been described in FIG. 8 that the influence of the landing interference is the "change amount of the inter-dot distance", the influence of the landing interference may be measured as a change in dot density or a change in dot shape.

The landing interference data parameterized as a function of the inter-dot distance d can be acquired from the reading result of the first continuous dot patterns 104C, 104M, 104Y and 104K and the second continuous dot patterns 106C, 106M, 106Y and 106K in the characteristic parameter acquisition chart 100 described in FIG. 5.

The parameters related to the landing interference are calculated for the respective printing elements (in this example, the respective nozzles), and are averaged. The value acquired by averaging the parameters for each color may be retained, or the value acquired by averaging the parameters for all the colors may be retained as a common parameter.

It has been described in FIG. 5 that the single dot pattern and the continuous dot pattern are used in a case where it is assumed that the droplet kind is one for each color of CMYK. However, in a case where the droplet kind is plural, it is assumed that the single dot pattern is formed by independently jetting the respective kinds of dots and the continuous dot pattern is formed by jetting the combination of the respective kinds of dots so as to overlap each other. The parameters related to the landing interference for the combination of the respective droplet kinds are acquired. The continuous dot pattern may be formed by jetting the combination of the dots of the respective CMYK colors so as to overlap each other, and the parameters related to the landing interference may be acquired for the combination of the dots of the respective colors.

<Requirements for Halftone Process>

For example, as the requirements required in the halftone process, there are the following requirements. That is, as a first classification (a) of the requirement, there are image quality, system cost, halftone generating time, and halftone processing time. As a second classification (b) of the requirement, there are "granularity" and "tolerance to a system error" which are related to the image quality. The plurality of requirements has the trade-off relationship. As the tolerance to the system error, there is "tolerance to environment change". For example, since the density of the ink and the spread amount of the dot are changed due to the influence of temperature or humidity, it is considered that the halftone processing rule is designed by simulating the influence thereof as the tolerance to the environment change.

In the present embodiment, the two or more kinds of halftone processing rules of the halftone process of which the balances of priority for the plurality of requirements required in the halftone processing are different are generated. However, the "plurality of requirements" includes at least two items of the image quality, the system cost, the halftone generating time, the halftone processing time, the tolerance to the system error or the tolerance to the environment change, which are described above.

<Advantages and Disadvantages of Halftone Algorithm and Each Requirement>

The advantages and disadvantages of various halftone algorithms for the respective requirements such as the image quality, the system cost, the halftone generating time and the halftone processing time of the first classification (a) are represented in the table of FIG. 9. Here, as the halftone algorithm, three kinds of methods including the dither method, the error diffusion method, and the direct binary search (DBS) method are compared.

The system cost includes cost related to another system specification such as central processing unit (CPU) performance or memory capacity required to realize the function of the halftone process. The halftone generating time is time necessary to generate the halftone processing rule, and includes, for example, time necessary for calculation for determining the halftone parameter. The halftone processing time is time necessary for process of converting the data of the continuous-tone image into the data of the halftone image by using the generated halftone processing rule.

If three kinds of halftone algorithms including the dither method, the error diffusion method and the DBS method are compared, as for the image quality, the image quality is relatively low in the dither method, the image quality is relatively high quality in the DBS method, and the image quality is medium image quality therebetween in the error diffusion method. As for the system cost, the cost is relatively low in the dither method, and the cost is relatively high in the DBS method. The system cost in the error diffusion method is a medium level between the dither method and the DBS method. The halftone generating time and the halftone processing time are relatively short in the dither method, and are relatively longer time in the DBS method. The halftone generating time and the halftone processing time are medium levels between the dither method and the DBS method.

The advantages and disadvantages for the respective requirements are changed by the setting of the halftone parameter even in the same halftone algorithm in addition to the relative advantages and disadvantages due to the kind of the halftone algorithm shown in FIG. 9. For example, in a case where the halftone algorithm is the dither method, the image quality becomes higher as the dither size becomes larger, but the system cost becomes higher and the halftone generating time or the halftone processing time becomes longer.

In a case where the halftone algorithm is the error diffusion method, the image quality becomes higher as an error diffusion matrix size becomes larger or as the number of gradation sections to which an error diffusion matrix is applied becomes greater, but the system cost becomes higher for another requirement, and the halftone generating time and the halftone processing time becomes longer.

In a case where the halftone algorithm is the DBS method, the image quality becomes higher as the number of times pixels are updated becomes greater or as an exchange pixel range becomes wider, but the system cost becomes higher for another requirement, and the halftone generating time or the halftone processing time becomes longer.

As for the second classification (b) of the requirement, the error occurs in the characteristic parameters such as the dot density, the dot diameter, the dot shape, the jetting bending and the non-jetting due to the printing order, the drawing path or the jetting timing, and the tolerance design to the system error can be performed such that a deterioration in granularity or stripe occurrence is suppressed, but the granularity in a state in which there is no error by the tolerance design is deteriorated. That is, the tolerance to the system error and the granularity have the trade-off relationship.

For example, the printing order as the cause of the system error is the order in which the ink colors overlap each other. The printing order may include the order of an outward path and an inward path in serial scan type head scanning. The path is the order of the paths in a drawing mode in which the drawing is completed multipath by the serial scan type ink jet head. In the case of a single path printer, a line in the main scanning direction corresponds to the "path". For example, in a case where the jetting is performed while sending the printing medium, the timing is taken on the assumption that the error occurs in the landing position or the dot shape by the jetting timing due to the influence of the transport error of the printing medium.

Since the characteristic parameters such as the dot density, the dot diameter, the jetting bending or the non-jetting are changed by the temporal state change of the printing element, these errors are regarded as the system error. It is difficult to reproduce the simulation by accurately acquiring the change of the dot density, the shape or the position due to the landing interference as the parameter from only the characteristic parameter acquisition chart shown in FIG. 5, and such a difference from the reality is regarded as the system error.

That is, the tolerance deign is performed by regarding the restrictions of the temporal state change of the system, the characteristic parameter acquisition chart or the image reading device 26 and the difference between the simulation image and the reality occurring by the limitation of the simulation model as the system error, optimizing the granularity in a state in which there is no difference and suppressing the deterioration in granularity of a real image or the occurrence of the streak even though there are such differences.

In the dither method or the error diffusion method, for example, in the printing system such as a single path printer in which the respective printing elements are independently present in a range in which the width direction of the printing medium is wide, it is difficult to perform the halftone design such that the granularity is optimized by reflecting the characteristics such as the dot density, the dot diameter, the dot shape, the jetting bending or the non-jetting of each printing element.

Accordingly, in this case, the design is also performed such that the granularity is optimized based on the information of the average dot density, the dot diameter or the dot shape for each ink droplet and the tolerance to the error such as the dot density, the dot diameter, the dot shape, the jetting bending or the non-jetting due to the individual characteristic of the plurality of printing elements is given.

<Description Using Specification Example>

In the image processing device 20 of the present example, two or more halftone processing rules are set depending on the priorities of the respective requirements based on the advantages and disadvantages of the respective requirements described above. The halftone processing rule is specified by the combination of the halftone algorithm and the halftone parameter.

[Setting Example 1]

For example, as a setting example of the priority, in a case where the setting is performed such that the image quality is important for the first classification (a) and the granularity is important for the second classification (b), the following halftone processing rule may be determined as the halftone processing rule corresponding to the setting (Setting Example 1) of the priority.

Halftone Algorithm: DBS Method

Halftone parameter: number of times pixel is updated=large, and exchange pixel range=large Tolerance design to system error: no An appropriate value belonging to a relatively large value of a plurality of value candidates capable of being selected on the system is set to a specific value that specifies the number of times the pixel related to the halftone parameter is updated or a specific value that specifies the exchange pixel range.

In the DBS method, the halftone processing rule is determined by simply designating the number of times the pixel is updated and the exchange pixel range as the halftone parameter.

[Setting Example 2]

For example, as another setting example of the priority, in a case where the setting is performed such that the halftone processing time is important for the first classification (a) and the tolerance to the system error is important for the second classification (b), the following halftone processing rule can be determined as the halftone processing rule corresponding to the setting (Setting Example 2) of the priority.

Halftone Algorithm: Dither Method

Halftone parameter: dither mask size=small

Tolerance design to system error: error of one pixel is added, and tolerance to "streaks" is considered Setting is performed such that granularity evaluation parameter α=1 and streak evaluation parameter β=1.

An appropriate value belonging to a relatively small value of a plurality of value candidates capable of being selected on the system is set to a specific value that specifies a dither mask size related to the halftone parameter. In the illustrated Setting Example 2, as for the second classification (b), since the extent of the system error is not understood in some cases and how much the system error influences the streak quality or granularity of a real image is not still understood, a plurality of values may be set depending on the priority of the tolerance to the system error. For example, a plurality of values such as "±1", "±2", . . . may be set to the error amount. As for the simulation of the landing interference, a plurality of settings such as "non-execution setting", "execution setting", "setting in which only dot movement due to the landing interference is simulated at the time of execution", and "setting in which a change in dot density or shape as well as the dot movement is simulated" may be performed. As for the setting of the dot movement due to the landing interference or the change in the density or shape, a plurality of settings may be performed by changing the values using the parameter acquired from the characteristic parameter acquisition chart as its reference.

The setting example is not limited to Setting Examples 1 and 2 described above, and the halftone processing rule corresponding to various settings of the priority may be generated.

Figure 10:
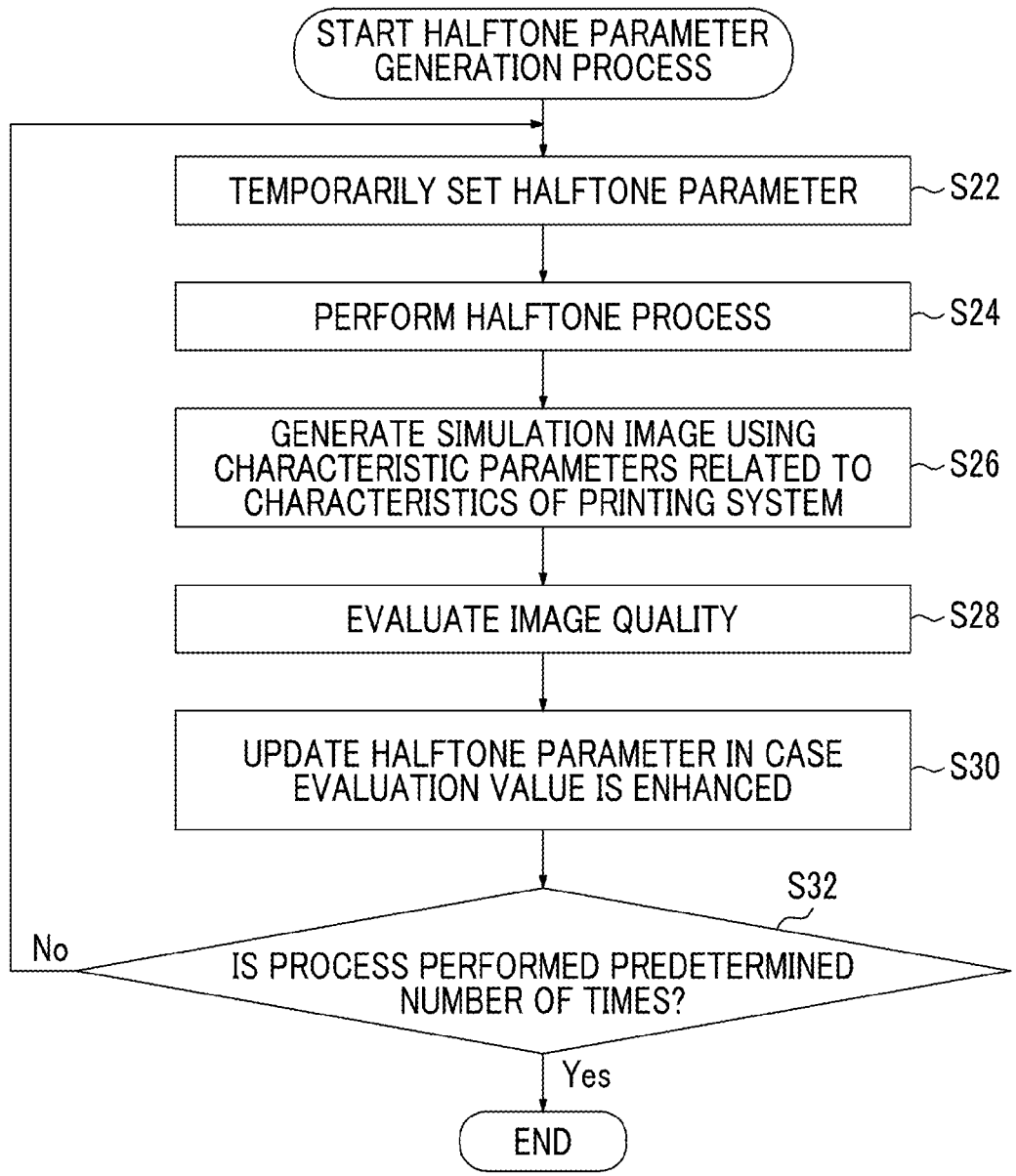
FIG. 10 is a flowchart related to a process of generating a halftone parameter.

In a case where the dither method or the error diffusion method is selected as the halftone algorithm, a process of generating the halftone parameter corresponding to each halftone algorithm is performed by a flowchart shown in FIG. 10.

FIG. 10 is a flowchart related to the process of generating the halftone parameter. The flowchart of FIG. 10 is a common flowchart in both the dither method and the error diffusion method. Here, the dither method will be described as an example.

Initially, the halftone parameter is temporarily set (step S22). In the dither method, the matrix size (that is, dither mask size) of the dither mask and each threshold being determined corresponds to the halftone parameter being determined. Various sizes such as 32×32, 64×64, 128×128 and 256×256 may be used as the dither mask size. The halftone parameter in a case where the dither mask size is designated represents the threshold of the dither mask, and the flowchart of FIG. 10 is repeated from 0 to the maximum value of the threshold.

After the halftone parameter is temporarily set in step S22, the halftone process is subsequently performed using the temporarily set halftone parameter (step S24). In the dither method, in step S24, dot-ON pixels from a threshold "0" to a current threshold are acquired. That is, a halftone image (dot arrangement) on which the halftone process to which the dither mask is applied has been performed is acquired from a single-gradation input image having a gradation of a current threshold.

Subsequently, a simulation image of a printed image is generated for the halftone image acquired in step S24 by using the characteristic parameters related to the characteristics of the printing system (step S26). In step S26, the dots on which the characteristic parameters related to the dot density, the dot shape, the dot diameter, the dot jetting bending or the non-jetting of each printing element are reflected are arranged so as to overlap the pixels of the halftone image, and thus, the simulation image of the print image is generated from the data of the dot pattern indicated by the halftone image.

Figures 11, 12A:
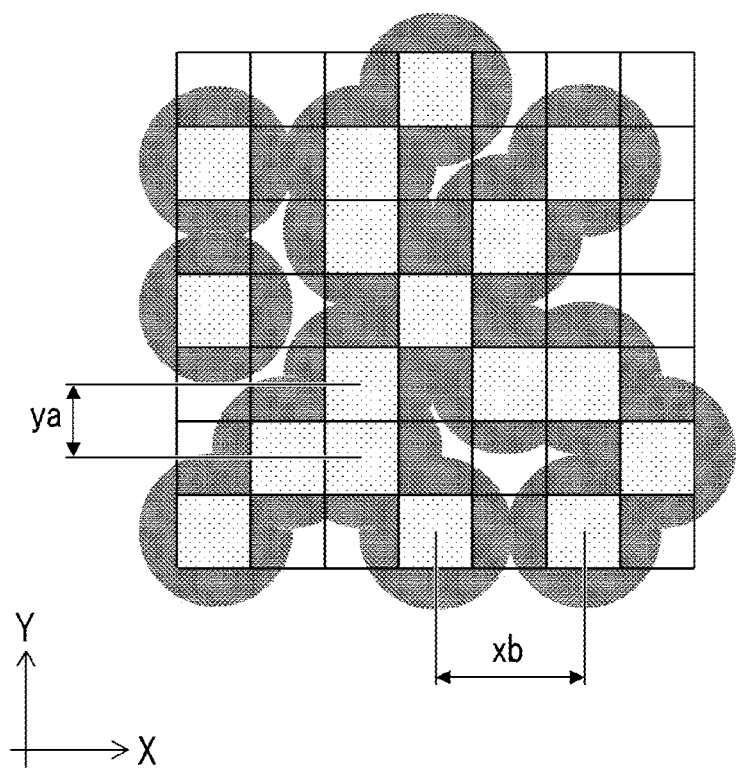
FIG. 11 is a conceptual diagram of the simulation image.
FIG. 12A shows that the jetting order in a drawing mode in which drawing is performed along 8 scanning paths is represented by a path number.

FIG. 11 is a conceptual diagram of the simulation image. In FIG. 11, the respective lattice cells represent the pixels of the image data. In the data of the halftone image, the cells of the "dot-ON" pixels are represented by a screentone pattern, and the "dot-OFF" pixels are represented by a white background.

When the simulation image is generated, the dots on which the recording characteristics such as the dot density, the dot diameter, the dot shape, the jetting bending or the non-jetting of each printing element serving to record the dot-ON pixels are reflected are arranged on the positions of the dot-ON pixels.

In this case, based on an arrangement state including surrounding dots or an arrangement state after the dots overlap, the dot shape after the landing interference may be calculated from the already acquired deformation parameter of the dot shape due to the landing interference, and the dots may be rearranged. For example, if the dot movement represented by a function of f(ya) is caused in the Y direction due to the influence of the landing interference by an inter-dot distance ya in the "sub scanning direction" (Y direction of FIG. 11) which is a direction parallel to the transport direction of the printing medium and the dot movement represented by a function of f(xb) is caused in the X direction due to the influence of the landing interference by an inter-dot distance xb in the "main scanning direction" (X direction of FIG. 11) which is a direction perpendicular to the transport direction of the printing medium, the dot shape caused by the dot movement of f(ya)+f(xb) is changed, and thus, the dots are rearranged.

Since the surrounding dots that cause the landing interference are present in a diagonal direction as well as the "sub scanning direction" or "main scanning direction" and are influenced by the landing direction, the dot movement represented by a function of $f(c_n)$ is caused in the direction of the dots due to the influence of the landing interference by an inter-dot distance $c_n$ with surrounding dots n in an arbitrary direction as well as the "sub scanning direction" or "main scanning direction", and thus, the dots may be moved by $f(ya)+f(xb)+f(c_1)+f(c_2)+ \ldots +f(c_n)$, and the dots may be rearranged. Of course, since the influence of the landing interference is different by the droplet kind, a function f(*) is different by the kind of surrounding dot. "*" represents a parameter. Due to the landing interference, the dot density or the dot shape as well as the dot movement may be changed, and the dots may be rearranged.

When the simulation image is generated in step S26 of FIG. 10, in a case where the printing device 24 is a printing system in which each printing element is independently present over a wide range in a width direction of the printing medium as in the single path printer, not the individual dot density, dot diameter and dot shape of each printing element but the average values of the dot densities, dot diameters and dot shapes of each printing element for each ink kind are used.

Subsequently, the image quality of the simulation image generated in step S26 is evaluated (step S28 of FIG. 10).

The image quality evaluation is performed by calculating at least one evaluation value of a value acquired by applying a low-pass filter such as a Gaussian filter or a visual transfer function (VTF) representing human visual sensitivity to the simulation image, performing frequency conversion and performing integral calculus, root mean square (RMS) granularity, or an error or a standard deviation with the input image. The value calculated in the image quality evaluation step of step S28 is stored as an "image quality evaluation value" in the memory.

Here, in a case where the tolerance design to the system error is performed, the generation (step S26) of the simulation image as described above and the calculation (step S28) of the image quality evaluation value are performed by applying at least one error of a predetermined dot density, a dot diameter, a dot shape, jetting bending or non-jetting to the dots of the pixels belonging to the same condition as at least one condition of the printing order, the path or the timing of the dot-ON pixels corresponding to the current threshold of the halftone processing result.

In a case where the tolerance design is performed such that the streaks are generated as well as the deterioration in granularity as the tolerance to the system error, a value acquired by performing one-dimensional frequency conversion and integral calculus, or an error or a standard deviation with respect to the value of the integral of the input image in the main scanning direction is calculated as a streak evaluation value by applying the error to the simulation image and performing integral calculus on the simulation image in the main scanning direction after the low-pass filter or VTF is applied. As the method of calculating a quantitative evaluation value of the granularity or streaks, the known method described in JP2006-67423A or JP2007-172512A may be used.

In the present example, the image quality evaluation value is calculated by the following equation, and the acquired value is retained.

Image quality evaluation value=granularity evaluation value[system error absence]+α×{granularity evaluation value[system error presence(+predetermined amount)]+granularity evaluation value [system error presence(−predetermined amount) }+β×{streak evaluation value[system error presence(+predetermined amount)]+streak evaluation value[system error presence(−predetermined amount)]}

The granularity evaluation value [system error absence] of the calculation expression of the image quality evaluation value is a granularity evaluation value calculated from the simulation image to which the system error is not added. The granularity evaluation value [system error presence (+predetermined amount)] is a granularity evaluation value calculated from the simulation image to which the plus (positive) predetermined amount as the system error is added. The granularity evaluation value [system error presence (−predetermined amount)] is a granularity evaluation value calculated from the simulation image to which the minus (negative) predetermined amount as the system error is added. The streak evaluation value [system error presence (+predetermined amount)] is a streak evaluation value calculated from the simulation image to which the plus (positive) predetermined amount as the system error is added. The streak evaluation value [system error presence (−predetermined amount)] is a streak evaluation value calculated from the simulation image to which the minus (negative) predetermined amount as the system error is added. The coefficients α and β are evaluation parameters, the coefficient α is a granularity evaluation parameter, and the coefficient β is a streak evaluation parameter. In a case where the tolerance to the system error is increased, α or β is set to be a larger value. Particularly, in a case where there is an attempt to allow "streaks" to be inconspicuous as well as the granularity, the value of β is increased. The coefficients α and β as the predetermined amount of the additional error, the kind (density, dot diameter, dot shape, jetting bending, non-jetting or landing interference) of the additional error or the evaluation parameter are determined depending on the priority of the system error tolerance described above.

As the predetermined amount of the addition error, the standard deviation σ of each item such as the dot densities, the dot diameters, or the jetting bending may be used. As the predetermined amount of the addition error, at least one of the standard deviation of the dot densities, the standard deviation of the dot diameters, the standard deviation of the dot shapes or the standard deviation of the jetting bending may be used, and an appropriate combination thereof may be used.

The image quality evaluation value in step S28 of FIG. 10 is calculated, and the halftone parameter is updated in a case where the image quality evaluation value is enhanced (step S30). In step S32, it is determined whether or not the steps of step S22 to step S30 are repeatedly performed the predetermined number of times. The "predetermined number of times" of step S32 in the dither method is the number of all pixels of candidates corresponding to the threshold.

If the step is performed the predetermined number of times and the step is not completed in the determination of step S32, the step returns to step S22, and the steps of step S22 to step S30 are repeated. In the determination of step S32, if the step performed the predetermined number of times is completed, the step is ended.

<Case of Error Diffusion Method>

An example in which the flowchart of FIG. 10 is applied to the generating of the halftone parameter in the error diffusion method will be described. In the error diffusion method, the halftone parameter indicates the setting of the size of the error diffusion matrix, the diffusion coefficient and the applied gradation section of each error diffusion matrix. Here, in order to simplify the description, it is assumed that one kind of common size is used as the size of the error diffusion matrix.

The flowchart of FIG. 10 is repeated for all the applied gradation sections, and thus, the diffusion coefficient of the error diffusion matrix of each applied gradation section is determined.

For example, the applied gradation section of the error diffusion matrix can be divided into five levels of 0-50, 51-100, 101-150, 151-200, and 201-255 in the case of an 8-bit gradation. The dividing method of the applied gradation sections may be performed by various determining methods, and the added gradation section may be equally divided into m levels as an integer m of 2 or more or may be divided in arbitrary unequal gradation regions.

In a certain gradation section, the average value of the evaluation values of each gradation is used as the image quality evaluation value by temporarily setting the diffusion coefficient of the error diffusion matrix added to the gradation section (step S22), performing the halftone process on the input image (single-gradation uniform image) of each gradation in the gradation section (step S24 of FIG. 10), generating the simulation image (step S26) and the calculating the image quality evaluation value (step S28).

When the halftone parameter is temporarily set in step S22, it is assumed that the initial value of the diffusion coefficient of the error diffusion matrix is 1/matrix size. When the temporal setting is repeated the predetermined number of items, in the temporal setting of the error diffusion matrix coefficient after the second temporal setting (step S22), the temporal setting is performed by adding "±random numbers in a predetermined range" to the respective coefficients of the best error diffusion matrix and standardizing the summation of coefficients to be "1".

It is preferable that a diffusion coefficient of an error diffusion matrix of an adjacent gradation section which has been already optimized is used as an initial value of a diffusion coefficient related to an error diffusion matrix of an adjacent gradation section.

The simulation image of step S26 is generated as in the dither method. The image quality evaluation (step S28) is performed as in the dither method. However, in a case where the tolerance design to the system error is performed, the simulation image is generated by performing the error addition to the dots of the pixels belonging to the printing order, the path or the timing, the granularity or streak evaluation values are calculated, and the summation thereof is used as the "evaluation value". For example, the granularity evaluation value in the system error presence is represented by the following expression.

Granularity[system error presence]=granularity evaluation value[system error presence(addition of "+predetermined amount" error to first group)]+granularity evaluation value[system error presence(addition of "+predetermined amount" error to second group)]+ . . . +granularity[system error presence(addition of "−predetermined amount" error to first group)]+ granularity evaluation value[system error presence(addition of "−predetermined amount" error to second group)+ . . . .

Here, the group classification such as the first group and the second group indicates a pixel group belonging to the same condition as at least one condition of the printing order, the path or the timing. For example, in the case of a drawing mode in which drawing along 8 inward and outward paths is completed, the group may be sequentially classified such that a pixel group recorded along a first path is a first group and a pixel group recorded along a second path is a second group, and a pixel group recorded in along eight path may be an eighth group.

The "predetermined amount" of the error added to the pixels belonging to each classified group may have the same value between the groups, or may have different values for each group. The "+predetermined amount" and the "−predetermined amount" may have the same absolute value, or may have different absolute values.

Figure 12B:
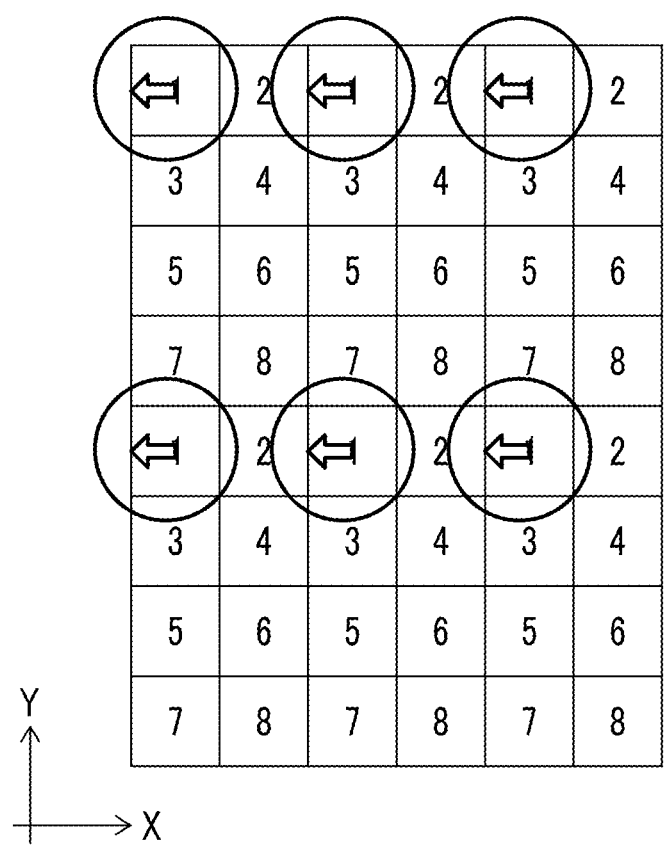
FIG. 12B is a conceptual diagram in a case where a predetermined amount of error is added to dots of pixels of a first path in a case where the drawing is performed in the drawing mode shown in FIG. 12A.

FIG. 12A shows that the jetting order in a drawing mode in which drawing is performed along 8 scanning paths with predetermined recording resolution is represented by a path number. FIG. 12B is a conceptual diagram in a case where a predetermined amount of error is added to the dots of the pixels of the first path in a case where the drawing is performed in the drawing mode shown in FIG. 12A. In FIG. 12B, the error of the jetting bending in the X direction is added to the dots of each pixel groups jetted along the first path. The error may be added to the pixel group of another path number.

Figure 13:
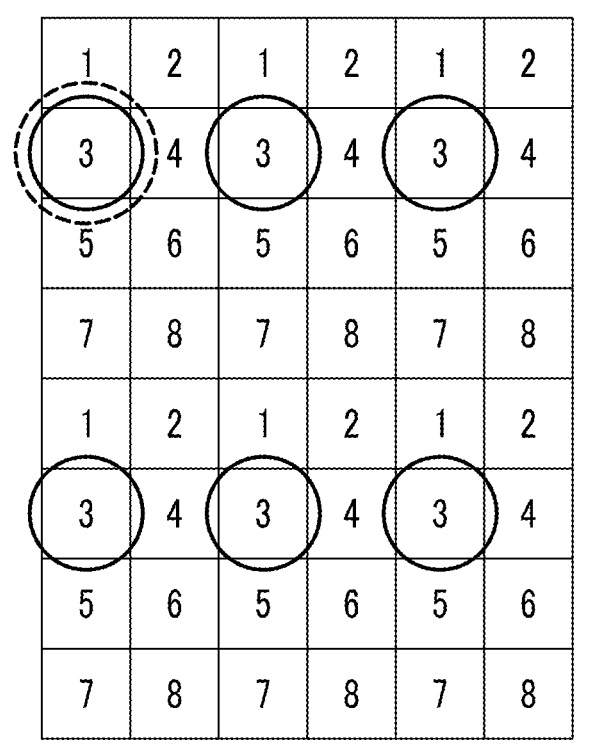

FIG. 13 shows that the error in which the dot diameter is decreased by a predetermined amount is added to the dots of the pixels of the third path in a case where the drawing is performed in the drawing mode shown in FIG. 12A. The dot diameter depicted by a broken line of FIG. 13 indicates an average dot diameter having no error.

<Another Example of Dither Method>

Figure 14:
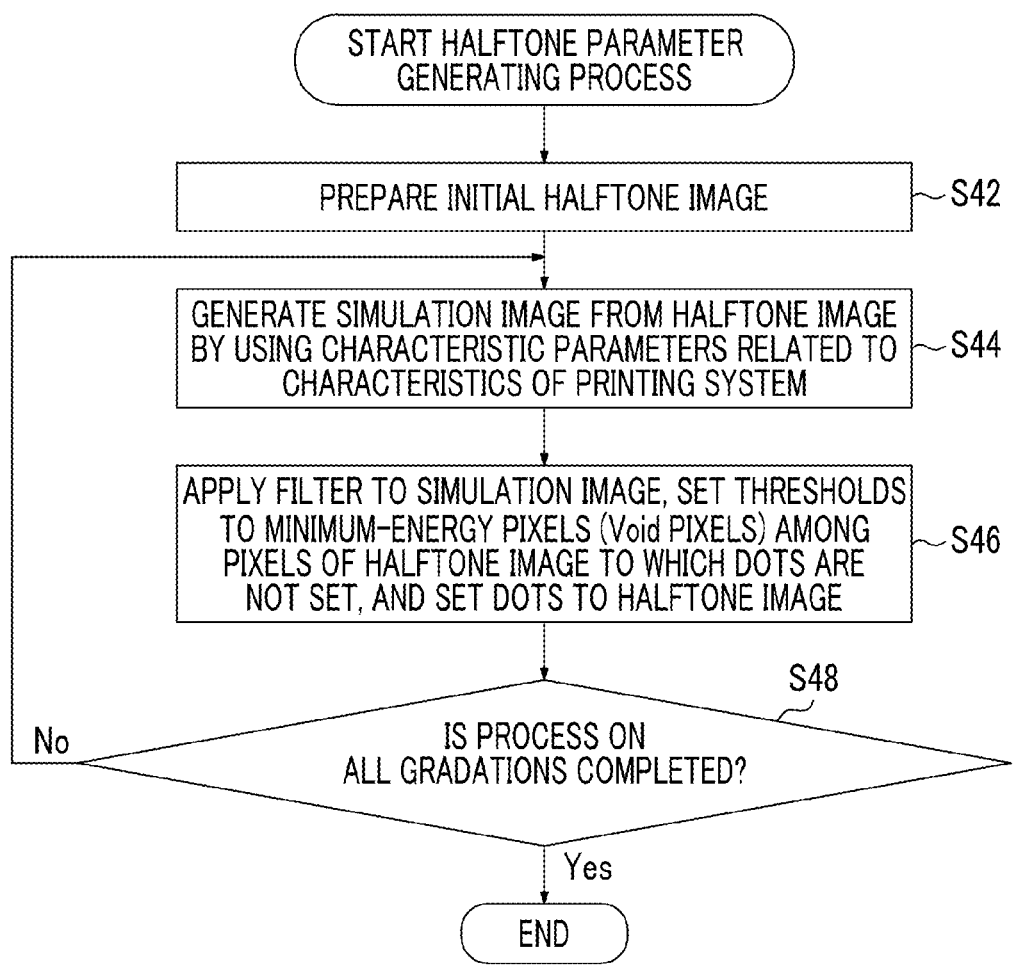
FIG. 14 is a flowchart of an example in which a dither mask is generated using a void-and-cluster method.

The dither method is not limited to the flowchart described in FIG. 10, and a void-and-cluster method may be used. FIG. 14 is a flowchart of the void-and-cluster method.

Initially, a halftone initial image is prepared (step S42). A method of generating the halftone initial image follows the void-and-cluster method. That is, in an energy image acquired by applying a filter to a simulation image having a specific gradation, the initial image is generated by regarding pixels having a maximum energy value as cluster pixels in which dots are dense, regarding minimum-energy pixels as void pixels in which dots are sparse and repeatedly exchanging the cluster pixels and the void pixels. For example, an initial image having a gradation value "128" in image data expressed by gradations from 0 to 255 is generated using a gradation value which is about 50% of a maximum density as the specific gradation.

Subsequently, a simulation image is generated from the halftone image by using the characteristic parameters related to the printing system (step S44). The method of generating the simulation image is the same as that in the example described in FIG. 11. A filter is applied to the simulation image generated in step S44, thresholds are set to the minimum-energy pixels (that is, void pixels) of pixels of the halftone image to which dots are not set, and dots are set to the void pixels of the halftone image (step S46). For example, a Gaussian filter is used as the filter used when the filter is applied.

In step S48, it is determined whether or not the setting (that is, the setting of the dots) of the thresholds to all the gradations is completed, and if the setting is not completed, the step returns to step S44, and the steps of steps S44 and S46 are repeated. That is, in step S46, the simulation image is generated from the halftone image to which dots are newly added (step S44), and the energy image acquired by applying the filter to the simulation image is generated and the thresholds are set to the minimum-energy pixels (step S46).

In step S48, if the step on all the gradations is completed, the step of FIG. 14 is ended.

The flowchart shown in FIG. 14 is the process in a direction in which the thresholds are increased from the initial image, but a method in which the thresholds (that is, gradation values) are decreased from the initial image also follows the void-and-cluster method. That is, a process of setting the thresholds to the cluster pixels among the pixels to which the dots are set by regarding the maximum-energy pixels of the energy image acquired by applying the filter to the simulation image as the cluster pixels in which the dot are dense, a process of generating the simulation image by removing the dots of the pixels, a process of setting the thresholds by applying the filter, and a process of removing the dots are sequentially repeated. For example, a Gaussian filter is used as the filter used when the filter is applied.

Similarly to the example described in FIG. 10, in a case where the tolerance design to the system error is performed, the simulation image is generated by adding at least one kind of error of the error of the predetermined amount of dot density, the error of the dot diameter, the error of the dot shape, the error of the jetting bending or the error of the non-jetting to the dots of the pixels belonging to the same condition as at least one condition of the printing order, the path or the timing of the pixels corresponding to the current threshold (step S44), and the filter is applied (step S46).

In a case where the tolerance design to the streaks is performed, one-dimensional energy (that is, streak energy) is calculated as streak energy by adding the predetermined amount of error to the simulation image, applying the filter to the simulation image, and performing integral calculus on the simulation image in the main scanning direction. As the energy of the entire print image, the pixels which have a minimum image evaluation value to be represented below and include a streak energy component are searched.

$$\text{Image evaluation value} = \text{energy[system error absence]} + \alpha \times \{\text{energy[system error presence(+predetermined amount)]} + \text{energy[system error presence(-predetermined amount)]}\} + \beta \times \{\text{streak energy[system error presence(+predetermined amount)]} + \text{streak energy[system error presence(-predetermined amount)]}\}$$

Through the method described in FIG. 10 or 14, the halftone parameter of the dither method or the error diffusion method is determined, and the halftone processing rule specified by the combination of the halftone algorithm and the halftone parameter. By doing this, the multiple kinds of halftone processing rules are generated.

<Halftone Selection Chart>

In the printing system 10 according to the present embodiment, the halftone selection chart is output in order to provide determination information when one kind of halftone processing rule used in printing is selected from the multiple kinds of halftone processing rules generated by the image processing device 20 (step S16 of FIG. 4).

For example, as the halftone selection chart, a chart including a gradation patch acquired by arranging a primary color such as cyan, magenta or yellow, a secondary color such as red, green or blue, a tertiary color or a quaternary color in a predetermined gradation level may be used. The halftone selection chart may include a gradation image acquired by continuously changing a gradation value instead of the acquired gradation patch to a patch, which is acquired by discretely changing a gradation value in the predetermined gradation level for each color, or by combining these patches.

The halftone selection chart may include a gradation image or a patch having a uniform density of a predetermined gradation according to a special color such as sky blue or pale orange. As the kind of the "special color", various colors may be set. The sky blue or the pale orange are examples of colors in which the granularity becomes a particularly sensitive issue in the printed material. As stated above, the particularly important color in the printed material is set as the "special color", and may be included in the image of the halftone selection chart.

The halftone selection chart is a chart capable of being used as determination information when an appropriate halftone process is selected by the user through the comparison of the qualities of the respective halftone processes, from the results of the halftone processes represented in the chart.

In order to facilitate the comparison of the qualities of the multiple kinds of halftone processes, it is preferable that a halftone selection chart in which the processing results of the multiple kinds of halftone processes are provided on one printing medium is generated.

Figure 15:
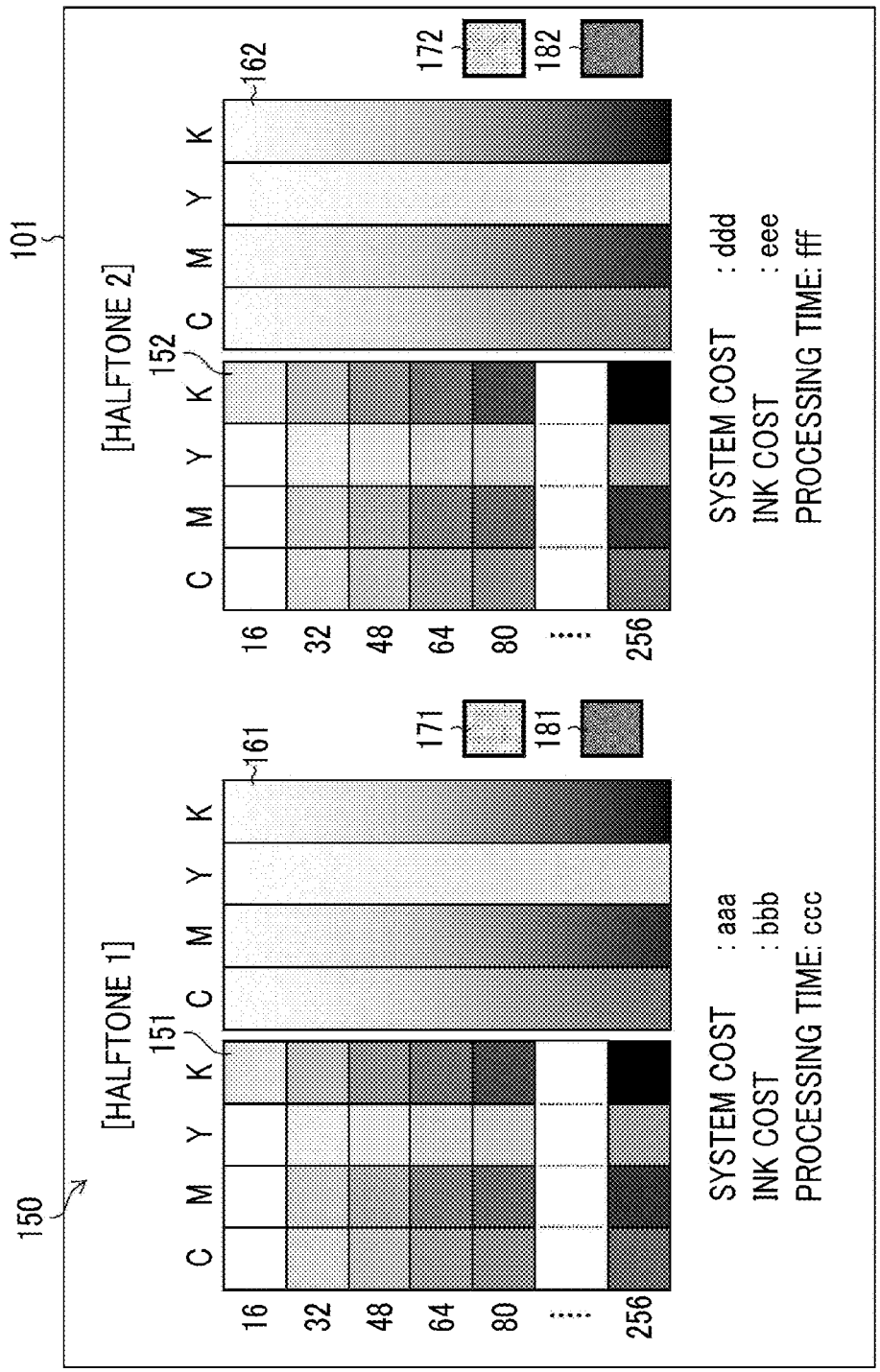
FIG. 15 is a schematic diagram showing an example of a halftone selection chart.

FIG. 15 is a schematic diagram showing an example of the halftone selection chart. In FIG. 15, an example of a halftone selection chart 150 printed by arranging the respective processing rules of the two or more kinds of halftone processing rules on one printing medium 101 is shown.

A chart region shown on the left side of FIG. 15 is a chart that represents the processing result of a first halftone processing rule (referred to as "Halftone 1"), and a chart region shown on the right side is a chart that represents the processing result of a second halftone processing rule (referred to as "Halftone 2").

In the halftone selection chart 150 of the present example, as for the respective halftone processes of the two or more kinds of halftone processing rules, a total of 32 primary color patches 151 and 152 acquired by dividing a gradation region having gradation values from 0 to 255 into 16 levels of "16" notches are arranged for the respective primary colors of C, M, Y and K.

For the sake of convenience in the illustration, FIG. 15 shows that some of the gradation levels are omitted and the number of patches is reduced. However, the primary color patches 151 and 152 corresponding to the respective gradation values of 16, 32, 48, 64, 80, 96, 112, 128, 144, 160, 176, 192, 208, 224, 240 and 255 are recorded for the respective colors of CMYK. Reference numeral 151 denotes primary color patches according to the processing result of the first halftone processing rule, and reference numeral 152 denotes primary color patches according to the processing result of the second halftone processing rule.

The halftone selection chart 150 includes gradation images 161 and 162 of the respective colors, sky blue patches 171 and 172 according to the a predetermined gradation of sky blue, and pale orange patches 181 and 182 according to a predetermined gradation of pale orange in addition to the arrangement of the primary color patches 151 and 152 of the respective colors of CMYK. Reference numeral 161 denotes gradation images according to the processing result of the first halftone processing rule, and reference numeral 162 denotes gradation images according to the processing result of the second halftone processing rule. The gradation images 161 and 162 are image regions of a shaded image acquired by continuously changing a gradation value in a range of a gradation region from a minimum gradation value to a maximum gradation value for the primary colors of the respective colors of CMYK.

Reference numeral 171 denotes sky blue patches according to the processing result of the first halftone processing rules, and reference numeral 172 denotes sky blue patches according to the processing result of the second halftone processing rule. Reference numeral 181 denotes pale orange patches according to the processing result of the first halftone processing rule, and reference numeral 182 denotes pale orange patches according to the processing result of the second halftone processing rule.

Information items related to system cost, ink cost and processing time for each halftone processing rule are printed on the halftone selection chart 150.

Although not shown in FIG. 15, information items indicating granularity evaluation value and/or streak evaluation value in association with the patches may be printed for some or all of the primary color patches 151 and 152. As a method of printing the information items in association with the patches, there are an aspect in which the information items are printed so as to overlap the patches, or an aspect in which the information items is printed close to the patches.

The same is true of the sky blue patches 171 and 172 or the pale orange patches 181 and 182, and the information items indicating granularity evaluation value and/or streak evaluation value in association with the patches may be similarly printed for some or all of the patches (171, 172, 181 and 182).

The user may compare the chart of the processing result according to the first halftone processing rule and the chart of the processing result according to the second halftone processing rule, and may select a preferable halftone processing rule.

The primary color patches 151 and 152, the gradation images 161 and 162, the sky blue patches 171 and 172 and the pale orange patches 181 and 182 of the halftone selection chart 150 shown in FIG. 15 are image regions for comparing and evaluating the quality of the halftone process, and correspond to one example of a "comparison and evaluation image region".

The chart is not limited to the form of the halftone selection chart 150 illustrated in FIG. 15, and various forms of charts may be used. A gradation image of another color such as the secondary color, the tertiary color or the quaternary color may be formed instead of the gradation images to the gradation images 161 and 162 of the primary colors illustrated in FIG. 15 or by a combination thereof. Various kinds of colors or layouts of patches or gradation images as the comparison and evaluation image region may be used.

When the halftone selection chart is output, in order to evaluate the tolerance (deterioration in granularity or suppression of streak occurrence) to the system error of the halftone process, the same chart may be disposed on the entire surface of the printing medium in a drawing executable range, or the content of the same chart may be output over multiple pages. The configuration in which the same chart is disposed on the entire surface of the printing medium in the drawing executable range is beneficial in a case where the tolerance to the system error depending on the printing position (printing place) within the drawing executable range is evaluated. The configuration in which the content of the same chart is output over multiple pages is beneficial in a case where the tolerance to the temporal system error is evaluated.

The "content of the same chart" refers to images having the same halftone processing result. The configuration in which the same chart is output so as to be disposed on the entire surface of the printing medium in the drawing executable range corresponds to one example of a configuration in which "the image of the same halftone processing result is output in different position on the printing medium multiple times". The configuration in which the content of the same chart is output over multiple pages corresponds to one example of a configuration in which the image of the same halftone process is output in different printing timings multiple times.

In the configuration in which the same chart is output over multiple pages, when the same chart is continuously output while temporally shifting the chart, a continuous chart output may be performed on the multiple kinds of halftone processes by switching the halftone process. In this case, it is preferable that the printing place (printing position on the printing medium) of the processing result of the same halftone process is fixed. In a case where the chart of the processing result of the same halftone process is output over multiple pages, the chart is printed in the same place of each printing medium, and thus, the influence of the system error depending on the place can be excluded.

In the configuration in which the same chart is output multiple times while spatially shifting the chart, the halftone processing results adjacent to each other on one printing medium may be processing results of different kinds of halftone processes. In the configuration in which the same chart is output multiple times while spatially shifting the chart, the same halftone processing results may be output on the same one printing medium. Accordingly, the influence of the system error with time can be excluded.

As described in FIG. 15, information beneficial to the determination or selection performed by the user is not limited to the image indicating the processing result of the halftone process, and at least one information item of the quantitative evaluation value of the granularity or streak, the system cost, the ink cost, the halftone generating time or the halftone processing time may be printed on the printed material of the halftone selection chart. For example, the "system cost" is indicated as cost an additional option for functional enhancement required to realize the system specification necessary to be performed within a required halftone processing time. As for the "ink cost", since a slight difference in the usage amount of ink is generated depending on the kind of the halftone process, ink cost is calculated from the ink usage amount for each kind of halftone in a case where the same image content is printed over a predetermined sheet of page, and information indicating the ink cost is presented. At least one of the system cost or the ink cost corresponds to "cost".

At least one information item of the quantitative evaluation value of the granularity or streak, the system cost, the ink cost, the halftone generating time or the halftone processing time related to the processing result of the halftone process may be displayed on the screen of the user interface instead of the configuration in which the halftone selection chart is printed and presented at the time of outputting or by a combination thereof. The configuration in which the information of the evaluation value related to such quantitative evaluation together with the halftone selection chart is printed, or the configuration in which the screen of the user interface is displayed corresponds to one example of "information presentation means". That is, the display device 32 (see FIGS. 2 and 3) of the image processing device 20 may function as the "information presentation means".

As for the quantitative evaluation value of the granularity or streak, the simulation image may be generated from the halftone processing result of the halftone selection chart by the above-described method and the granularity evaluation value or the streak evaluation value may be calculated. Alternatively, the output result of the halftone selection chart may be read by the image reading device 26 such as the in-line scanner, and the granularity evaluation value or the streak evaluation value may be calculated from the read image.

In order to evaluate the tolerance to the system error, the generation of the simulation image related to the halftone selection chart includes the generation of the simulation image by adding a predetermined amount of error to the dots of the pixel group belonging to the same condition as at least one condition of the printing order, the path or the timing.

In a case where the quantitative evaluation value of the granularity or streak is calculated from the simulation image, the calculated value may be printed on the printed material of the halftone selection chart.

Meanwhile, in a case where the output result of the halftone selection chart is read and the quantitative evaluation value of the granularity or streak is calculated from the read image, the calculation result may be displayed on the screen of the user interface. The user can select an appropriate halftone process by referring to the quantitative evaluation value displayed on the screen of the user interface and checking the printed material of the halftone selection chart.

As another method, in a case where the output result of the halftone selection chart is read and the quantitative evaluation value of the granularity or streak is calculated from the read image, the calculation result may be additionally printed on the read halftone selection chart. Alternatively, after the read halftone selection chart is output, when the same halftone selection chart is output, the already calculated quantitative evaluation value of the granularity or streak may be printed.

In a case where the information of the quantitative evaluation value of the granularity or streak is presented, an aspect in which a portion of the patch in which a difference in evaluation value or a change in evaluation value necessary to alert the user is generated is highlighted on the screen or the printed material is preferable.

For example, in a case where the halftone selection chart is output over multiple pages with a temporal difference between the printing timings and the change with a change in time is checked, the notification that a change in quantitative evaluation value calculated from the read image of the halftone selection chart exceeds an allowable range and is large may be highlighted so as to alert the user. In this case, the history of the quantitative evaluation value is stored in the memory, and a differentiated display or another highlight display is performed in a case where the change amount of the quantitative evaluation value exceeds the allowable range.

In addition to checking the temporal system error, that is, instability of the system for time using the halftone selection chart, it is possible to check the system error depending on the printing position (place) on the printing medium, that is, the instability of the system for the space (place) by using the halftone selection chart. In this case, the notification that a difference in quantitative evaluation value exceeds the allowable range and is large due to a difference in place may be highlighted so as to alert the user.

After one halftone processing rule is selected by the automatic selection of the system or the selection operation of the user, a plurality of other halftone processing rules of which the priority balances of the first classification (a) and the second classification (b) of the requirements approximate the selected halftone processing rule may be further generated, the image quality evaluation value or the total evaluation value may be calculated based on the priority parameter or the halftone selection chart may be output, and the system or the user may select an optimum halftone processing rule and the calculated values or output halftone selection chart. In a case where the system automatically selects the halftone process, the halftone processing rule may be repeatedly generated until the image quality evaluation value or the total evaluation value is equal to or greater than a predetermined threshold.

<Method of Generating Halftone Selection Chart Using DBS Method>

Figure 16:
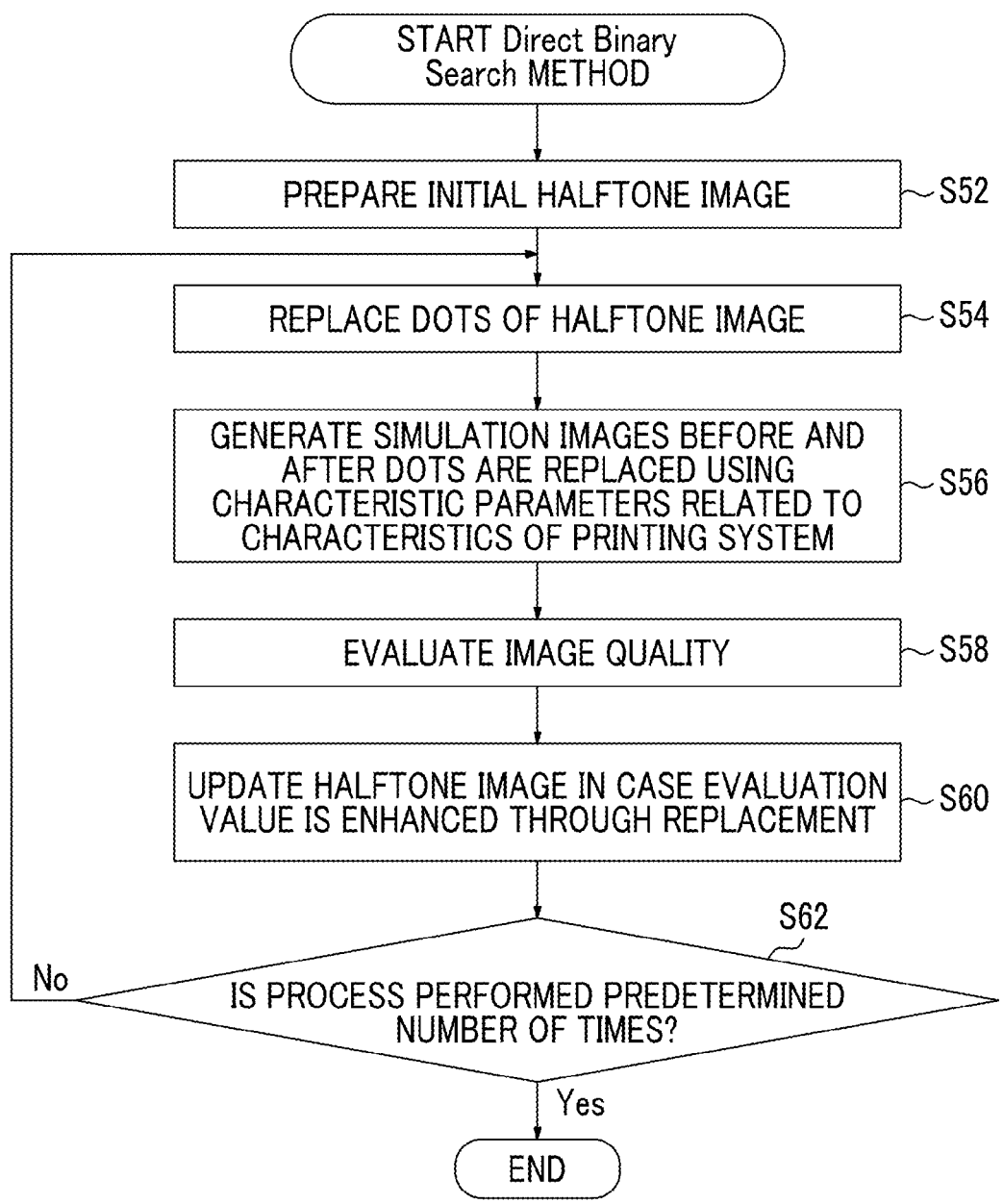
FIG. 16 is a flowchart showing a procedure of generating a halftone image of the halftone selection chart using a DBS method.

FIG. 16 is a flowchart showing a procedure of generating the halftone image of the halftone selection chart using the DBS method. In the DBS method, the halftone image of the halftone selection chart is acquired based on the already determined halftone parameter according to the flowchart of FIG. 16.

Initially, the initial halftone image is prepared (step S52). The initial halftone image is separately generated by performing a dither process using the halftone processing rule of the dither method generated in step S14 of FIG. 4 or a simply generated dither mask on the halftone selection chart.

Subsequently, a process of replacing the dots of the halftone image is performed (step S54 of FIG. 16). The simulation images are generated using the characteristic parameters related to the characteristics of the printing system before and after the dots are replaced (step S56). The image quality is evaluated for the generated simulation images (step S58), and the halftone image is updated in a case where the evaluation value is enhanced before and after the dots are replaced (step S60). The image quality evaluation value calculated when the image quality is evaluated in step S58 is acquired by applying the low-pass filter such as the Gaussian filter or the visual transfer function (VTF) representing the human visual sensitivity and calculating an error (difference) between the input image and the simulation image.

The steps from step S54 to step S60 are repeated by repeatedly replacing dots a predetermined number of times according to the previously set "pixel updating number of times".

In step S62, it is determined whether or not the process of replacing the dots the predetermined number of times is completed. In a case where the process of replacing the dots the predetermined number of times is not completed, the step returns to step S54, and the steps from step S54 to step S60 are repeated. In step S62, in a case where it is determined that the process of replacing the dots the predetermined number of times is completed, this process is ended.

<Means for Compensating for Image Quality Deterioration Due to Influence of Landing Interference>

It has been described that it is assumed that the simulation image including the landing interference is generated in order to acquire a favorable halftone processing result by adding the influence of the landing interference in the generation of the respective halftone parameters of the dither method and the error diffusion method represented by the flowcharts of FIGS. 10 and 14 or the halftone process of the direct binary search (DBS) method represented by the flowchart of FIG. 16. However, since an excessive time necessary to simulate the landing interference and simulation accuracy are problems, it is preferable that image quality deterioration due to the influence of the landing interference can be compensated by a simple method without performing the simulation. From such a viewpoint, a configuration in which means for compensating for the image quality deterioration due to the landing interference when the dots are in contact is provided is one of a desirable form.

For example, in order to compensate for granularity deterioration due to the influence of the landing interference, the moving direction or moving amount may be estimated for the dot of each pixel based on the kind, contact direction or contact amount of surrounding dots, each dot may be classified as a small group having the same moving direction and/or same moving amount based on the moving direction and/or moving amount, and the halftone parameter may be generated or the halftone process may be performed while favorably maintaining the granularity of each small group. In order to compensate for streak, unevenness occurrence and granularity deterioration due to the landing interference in a case where there are the errors of the dot diameter, the dot shape, the jetting bending and the non-jetting, at least one error of a predetermined dot diameter, a dot shape or jetting bending may be added to the dots of the pixel group belonging to the same printing order, path or timing, the moving direction or moving amount may be estimated for the dot of each pixel of the group based on the kind, contact direction or contact amount of surrounding dots, each dot may be classified as a small group having the same moving direction and/or moving amount based on the moving direction and/or moving amount, and the halftone parameter may be generated or the halftone process may be performed while favorably maintaining the granularity of each small group.

Alternatively, in order to compensate for the streak, unevenness occurrence and granularity deterioration due to the landing interference in a case where there is at least one error of the dot diameter, the dot shape or the jetting bending, even though at least one error of a predetermined dot diameter, a dot shape or jetting bending is added to the dots of the pixel group belonging to the same printing order, path or timing, the generation of the halftone parameter or the halftone process may be performed such that a change in contact state of the dots of the group with the surrounding dots is decreased.

<Significance of What Halftone Selection Chart is Output>

The halftone selection chart has at least one significance of a first significance of what the halftone selection chart is output to compare the processing results of the two or more kinds of halftone processing rules or a second significance of what the halftone selection chart is output to check the instability of the system. The chart configuration in which the processing results of the two or more kinds of halftone processing rules are provided on one printing medium 101 is beneficial to the first significance. Meanwhile, in a case where the second significance is paid attention to, the processing results of the two or more kinds of halftone processing rules are not necessarily provided on one printing medium 101. In order to check the instability of the system depending on the place or check the instability of the system for the time, the chart form in which only the processing rule of one kind of halftone processing rule is recorded on one printing medium 101 may be used.

<Generation of Two or More Kinds of Halftone Processing Rules and Comparison of these Processing Results>

It has been described in the present embodiment that at least two kinds of halftone processing rules are generated, and more preferably, two or more halftone processing rules are generated.

Figure 17:
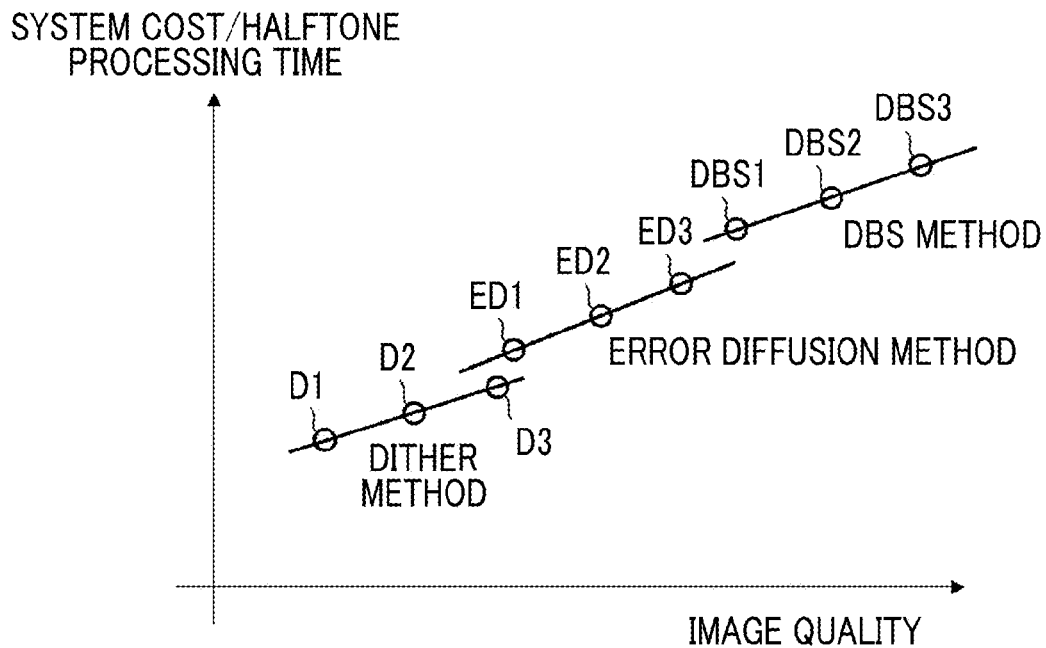
FIG. 17 is a graph showing qualitative tendencies of various halftone processing rules.

FIG. 17 is a graph showing qualitative tendencies of various halftone processing rules in a case where a horizontal axis represents the image quality and a vertical axis represents the system cost or the halftone processing time. If the comparison is relatively performed on the halftone algorithms of the dither method, the error diffusion method and the DBS method, the image quality becomes higher in sequential order of the dither method, the error diffusion method and the DBS method, and the system cost or the halftone processing time becomes higher or longer in sequential order of the dither method, the error diffusion method and the DBS method. However, in all the dither method, the error diffusion method and the DBS method, the balance between the image quality and the system cost/the halftone processing time can be changed depending on the setting of the halftone parameter.

Various kinds of halftone processes of which the balances of the requirements are different may be set. However, in the example shown in FIG. 17, a total of 9 kinds of settings in which the level of the "image quality" is divided into 3 levels of low/medium/high are performed for the dither method, the error diffusion method and the DBS method. In FIG. 17, D1, D2 and D3 represent 3 kinds of settings in the dither method, ED1, ED2 and ED3 represent 3 kinds of settings in the error diffusion method, and DBS1, DBS2 and DBS3 represent 3 kinds of settings in the DBS method.

Figure 18:
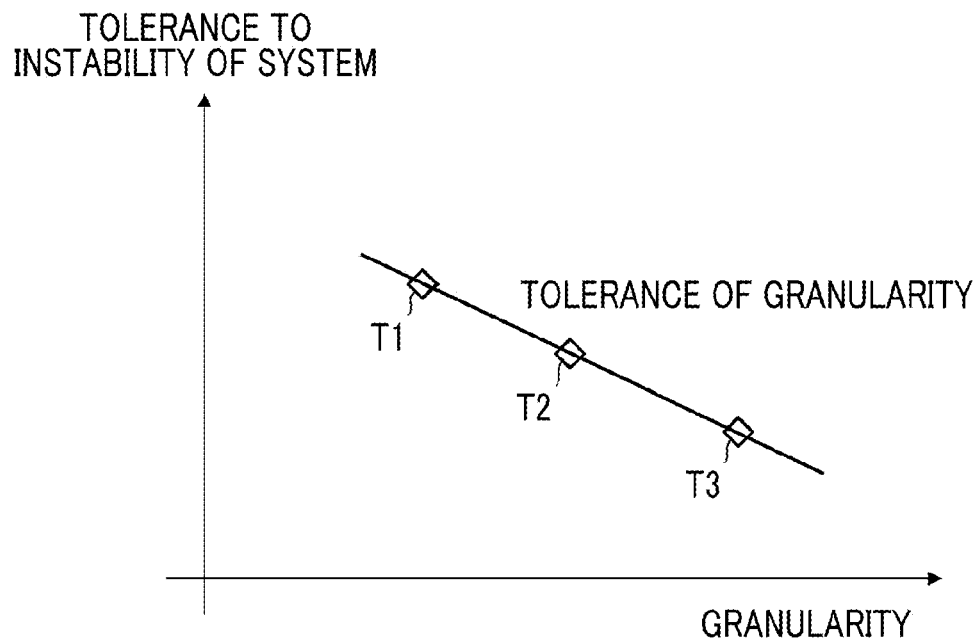
FIG. 18 is a graph showing the relationship between tolerance to instability of the system and granularity.

Unlike the advantages and disadvantages of each requirement depending on the halftone algorithm described in FIG. 17, if the granularity is improved using one parameter irrespective of the halftone algorithm, there is a tendency for the tolerance to the instability of the system to be deteriorated, as shown in FIG. 18.

In FIG. 18, a horizontal axis represents the granularity, and a vertical axis represents the tolerance to the instability of the system. In FIG. 18, as the tolerance to the instability of the system, there are both the tolerance of the granularity and the tolerance of the streaks, but there is the same qualitative tendency in both these tolerances. In FIG. 18, only the tolerance of the granularity is illustrated. That is, as shown in FIG. 18, there is a tendency for the tolerance to the instability of the system to be deteriorated and the tolerance of the streaks to be deteriorated if the granularity is increased. In contrast, there is the relation that the tolerance to the instability of the system is improved and the tolerance of the streaks is also improved if the granularity is sacrificed.

For example, as the setting example of the tolerance to the instability of the system, it is considered that 3 kinds of settings in which the level of the tolerance is divided into 3 levels of high/medium/low are performed. In FIG. 18, T1, T2 and T3 represent 3 kinds of settings performed on the tolerance to the instability of the system.

Two or more kinds of halftone processing rules of which the balances of the plurality of requirements for the halftone process are different are generated based on the qualitative tendency described in FIGS. 17 and 18. For example, a total of 27 kinds of halftone processing rules may be generated as a default by combining 9 kinds of settings described in FIG. 17 with 3 kinds of settings related to the tolerance of the granularity described in FIG. 18.

The halftone selection charts according to the processing results of 27 kinds of halftone processing rules may be output, and one halftone processing rule may be selected from these charts by the user.

As another method, the user may designate the setting of the priority for the requirement, may generate two kinds or several kinds of halftone processing rules which approximate the setting of the priority, may previously reflect the intension of the user, and may narrow the presentation range of the kind of the halftone process.

For example, the kind of the halftone algorithm may be previously restricted and the halftone processing rule may be generated such that the DBS method or the error diffusion method is used in a case where the setting in which the image quality is important is designated, the error diffusion method is used in a case where the setting in which the image quality and the cost balance are important is designated, and the dither method is used in a case where the setting in which the cost is important is designated.

A quantitative requirement value as a target is previously estimated to some extent for the halftone processing time or the cost of the requirements in many cases. That is, in order to meet the requirements such as productivity, the user can previously set a target value to the halftone processing time or the cost in many cases.

Accordingly, one or a plurality of halftone processing rules may be selected from 27 kinds of halftone processing rules within a range that satisfies the requirements (target value) of the user, and may be actually output as the halftone selection chart.

<Selection of Halftone Process>

The method of selecting one halftone processing rule from the two or more kinds of halftone processing rules is not limited to a form in which the user checks the chart output of the halftone selection chart and selects any one halftone process, and the system may automatically select one halftone process.

In this case, the system previously retains the priority parameters for the plurality of requirements. For example, there is the image quality, the system cost or the halftone generating time as the first classification (a) of the requirement, and there is the granularity or the tolerance to the system error as the second classification (b) of the requirement. The system previously retains the following parameters A, B, C, D, p, q and r, and the total evaluation value is calculated by the following expression.

Total evaluation value=$A$×image quality evaluation value+$B$×system cost+$C$×halftone generating time+$D$×halftone processing time Image quality evaluation value=$p$×granularity evaluation value[system error absence]+$q$×{granularity evaluation value[system error presence(addition of "+predetermined amount" error to first group)]+granularity evaluation value[system error presence(addition of "+predetermined amount" error to second group)]+ . . . +granularity evaluation value[system error presence (addition of "−predetermined amount" error to first group)]+granularity evaluation value[system error presence(addition of "−predetermined amount" error to second group)]+ . . . }+$r$×{streak evaluation value[system error presence (addition of "+predetermined amount" error to first group)]+streak evaluation value[system error presence(addition of "+predetermined amount" error to second group)]+ . . . +streak evaluation value[system error presence(addition of "−predetermined amount" error to first group)]+streak evaluation value[system error presence(addition of "−predetermined amount" error to second group)]+ . . . }

Here, in order to acquire the image quality evaluation value, the simulation image is generated from the halftone processing result of the halftone selection chart by the above-describe method, the granularity evaluation values or the streak evaluation values are calculated, the values of the evaluation are appropriately averaged values for each color, each gradation, sky blue or pale orange.

The granularity evaluation values or the streak evaluation values may be averaged or may not be average for the ink kind. In order to acquire the granularity or streak evaluation values for the system error, the generation of the simulation image includes the generation of the simulation image by respectively adding the error to the dots of the pixel group belonging to the same condition as the printing order, the path or the timing.

As the predetermined amount of the added error (that is, a predetermined error amount), an appropriate value may be separately determined, or may be a standard deviation calculated from the reading result of the characteristic parameter acquisition chart. Real numbers indicating the priorities are respectively set to the priority parameters A, B, C, D, p, q and r.

The simulation condition applied at the time of the halftone process generation of generating the two or more kinds of halftone processing rules does not necessarily coincide with the simulation condition applied at the time of the simulation image quality evaluation in the automatic selection of automatically selecting at least one halftone processing rule from the two or more kinds of halftone processing rules. For example, in order to promptly perform the generation of the halftone processing rule, the simulation in the halftone process generation may be performed in the condition in which the factor of the landing interference is not included or in the condition in which the simulation is performed in consideration of only the "dot movement" of the factor of the landing interference. In order to reliably reproduce the real image as possible, the simulation in the halftone automatic selection may be performed including all the changes of the dot movement, the dot shape and the dot density due to the landing interference. The "halftone process generation" mentioned herein refers to the generation of the halftone parameter in a case where the halftone algorithm is the dither method or the error diffusion method, and refers to the generation of the halftone image in the DBS method.

Alternatively, instead of the calculation of the evaluation value based on the simulation image, the halftone selection chart output by the printing device 24 may be read by the image reading device 26, the granularity evaluation value or the streak evaluation value may be calculated from the read image, the values of the evaluation values may be appropriately averaged for each color, each gradation, sky blue or pale orange, and the image quality evaluation value may be acquired by the following expression.

Image quality evaluation value=$p$×granularity evaluation value+$r$×streak evaluation value The respective allowable thresholds may be set to the image quality evaluation value, the system cost, the halftone generating time, the halftone processing time, the granularity evaluation value [system error absence], the granularity evaluation value [system error presence] and the streak evaluation value, the halftone processing rules of which the value is equal to or greater than the threshold may be initially extracted, and an optimum halftone process may be determined based on the total evaluation value from the extracted halftone processing rules.

For example, in a case where there is an attempt to determine the halftone process in which the system cost is as low as possible, there is a method of acquiring the total evaluation value by initially extracting the halftone processes of which the value is equal to or greater than the allowable threshold for the image quality evaluation value, the system cost, the halftone generating time, the halftone processing time, the granularity evaluation value [system error absence], the granularity evaluation value [system error presence] and the streak evaluation value and setting the priority parameter B to be a large value.

Even in a case where one halftone processing rule is automatically selected (determined) by the system according to the setting of the priority parameter, the halftone processing rule determined by the automatic selection may be appropriately changed by the user. It is preferable that various halftone processing rules generated by the image processing device 20 are registered as a line-up such that the halftone processing rule can be reselected by changing the setting of the priority parameter by the user operation or the program of the system.

It is preferable that information items of the quantitative evaluation value of the granularity or streaks, the halftone generating time, the halftone processing time and the system cost related to the halftone processing rule are stored in association with the halftone processing rule such that these information items are referred to if necessary.

That image quality evaluation value, the system cost, the halftone generating time or the halftone processing time for each color of the inks used in the printing device 24, that is, for each ink kind, the image quality evaluation value, the system cost, the halftone generating time or the halftone processing time may be calculated, different halftone algorithms or halftone parameters may be selected for ink kind. Alternatively, the image evaluation values, the system cost, the halftone generating times or the halftone processing times may be calculated for all colors, and the same common halftone algorithm or halftone parameters may be selected for all colors.

<Another Embodiment (Second Embodiment)>

It has been described in the above-described embodiment (first embodiment) that the two or more kinds of halftone processing rules are generated in the printing system based on the characteristic parameters of the printing system. However, when the invention is implemented, the configuration of the system that does not have a function of generating the halftone processing rule may be adopted.

That is, as a second embodiment, the means for acquiring the characteristic parameters related to the characteristics of the printing system or the means for generating the two or more kinds of halftone processing rules of which the balances of priority for the plurality of requirements are different may be omitted from the printing system 10 described in FIGS. 1 to 14. In this case, the printing system may previously include two or more kinds of halftone processing rules of which balances of priorities for requirements are different, may output the halftone selection chart by using the two or more kinds of halftone processing rules, and may determine the halftone process based on the user selection.

<Another Embodiment (Third Embodiment)>

Figure 19:
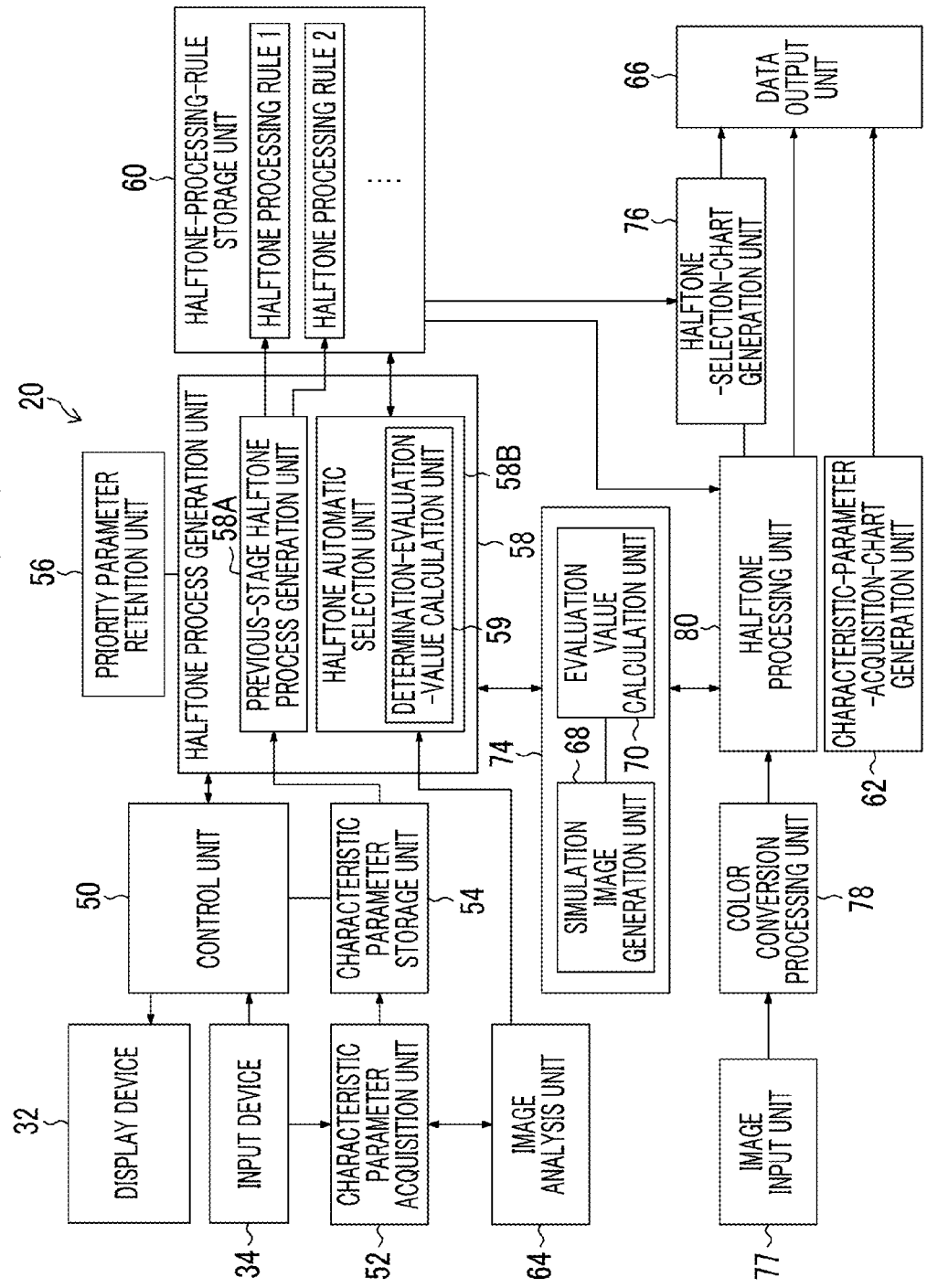
FIG. 19 is a block diagram for describing a function of an image processing device according to another embodiment.

FIG. 19 is a block diagram for describing a function of an image processing device 20 according to another embodiment. In FIG. 19, the same or similar elements as or to those of the configuration shown in FIG. 3 will be assigned the same reference numerals, and the description there of will be omitted. The configuration shown in FIG. 19 may be adopted instead of the configuration described in FIG. 3.

A halftone process generation unit 58 shown in FIG. 19 includes a previous-stage halftone process generation unit 58A, and a halftone automatic selection unit 58B. The previous-stage halftone process generation unit 58A generates halftone processing rules that define the processing contents of two or more kinds of halftone processes of which balances of priority for a plurality of requirements required in the halftone process are different based on the characteristic parameters. The halftone automatic selection unit 58B performs a process of automatically selecting the kind of the halftone process used in the printing of the present printing system 10 from the kinds of the halftone processes defined by the two or more kinds of halftone processing rules generated by the previous-stage halftone process generation unit 58A based on the priority parameters.

The previous-stage halftone process generation unit 58A corresponds to one example of "previous-stage halftone process generation means", and the halftone automatic selection unit 58B corresponds to one example of "halftone automatic selection means". The halftone automatic selection unit 58B includes a determination-evaluation-value calculation unit 59 as one example of "determination-evaluation-value calculation means".

The determination-evaluation-value calculation unit 59 is calculation means for calculating a determination evaluation value that evaluates the adequateness of the halftone process defined by the halftone processing rule generated by the previous-stage halftone process generation unit 58A. The determination-evaluation-value calculation unit 59 calculates the determination evaluation value based on the priority parameter retained by the priority parameter retention unit 56. That is, the halftone automatic selection unit 58B automatically selects the kind of the halftone process used in the printing of the present printing system 10 based on the determination and evaluation value calculated by the determination and evaluation calculation unit 59.

The priority parameter retention unit 56 stores the priority parameters that designate the balances of priority related to a plurality of requirements. The priority parameter retention unit 56 corresponds to one example of "priority parameter retention means". The step of causing the priority parameter retention unit 56 to store the priority parameters corresponds to one example of a "priority parameter retention step".

The image processing device 20 includes the image quality evaluation processing unit 74 which includes the simulation image generation unit 68 and the evaluation value calculation unit 70, and the halftone process generation unit 58 generates the halftone processing rule in cooperation with the image quality evaluation processing unit 74. The halftone process generation unit 58 corresponds to one example of "halftone process generation means". The simulation image generation unit 68 corresponds to one example of "simulation image generation means", and the evaluation value calculation unit 70 corresponds to one example of "image-quality-evaluation-value calculation means".

The image quality evaluation processing unit 74 performs an optimum searching process in which the evaluation value is enhanced while repeatedly performing the generation of the simulation image and the calculation of the evaluation value of the image quality for the simulation image. The halftone parameter is determined through the process performed by the image quality evaluation processing unit 74. The simulation image generation unit 68 generates the simulation image in a case where the halftone image acquired by applying the halftone process defined by the halftone processing rule generated by the previous-stage halftone process generation unit 58A is printed, and the evaluation value calculation unit 70 calculates the image quality evaluation value from the simulation image generated by the simulation image generation unit 68. The determination-evaluation-value calculation unit 59 of the halftone automatic selection unit 58B can calculate the determination evaluation value by using the image quality evaluation value calculated by the image quality evaluation processing unit 74.

The multiple kinds of halftone processing rules generated by the previous-stage halftone process generation unit 58A are registered in the halftone-processing-rule storage unit 60. For the sake of convenience in the description, it has been described in FIG. 19 that the two kinds of different halftone processing rules 1 and 2 are generated and these halftone processing rules 1 and 2 are stored and retained in the halftone-processing-rule storage unit 60. However, in a case where K is an integer of 2 or more, multiple kinds (K or more) of halftone processing rules may be generated. All or a part of the K or more kinds of generated halftone processing rules 1, 2, ..., and K may be registered as a line-up in the halftone-processing-rule storage unit 60. The halftone-processing-rule storage unit 60 corresponds to one example of "halftone registration means". The multiple kinds of halftone processing rules may be registered as candidates of the halftone processing rules capable of being used in the printing system 10 in the halftone-processing-rule storage unit 60.

The halftone processing rule used in the actual printing is determined from the plurality of halftone processing rules generated by the halftone process generation unit 58 in this manner.

The image processing device 20 of the present example has the function of automatically selecting one optimum halftone processing rule according to the priority parameter, but has a function of selecting a desired halftone process by the selection operation of the user in addition to the function of such automatic selection.

the image processing device 20 of the present example includes a halftone-selection-chart generation unit 76 as selection support means for selecting one halftone processing rule from the plurality of halftone processing rules.

The image analysis unit 64 functions as means for calculating a quantitative evaluation value of the halftone image by analyzing the read image of the output halftone selection chart. The determination-evaluation-value calculation unit 59 of the halftone automatic selection unit 58B may acquire information of at least one quantitative evaluation value of the granularity evaluation value or the streak evaluation value calculated by the image analysis unit 64 based on the output result of the halftone selection chart from the image analysis unit 64, and may calculate the determination evaluation value. The halftone automatic selection unit 58B may perform a process of automatically selecting the optimum halftone processing rule based on the quantitative evaluation value calculated from the read image of the halftone selection chart.

Meanwhile, the user can perform an operation of selecting a desired halftone processing rule while viewing the outputting result of the halftone selection chart. The selection operation of the halftone processing rule performed by the user is performed using the input device 34.

<Procedure of Determining Halftone Processing Rule in Printing System>

Figure 20:
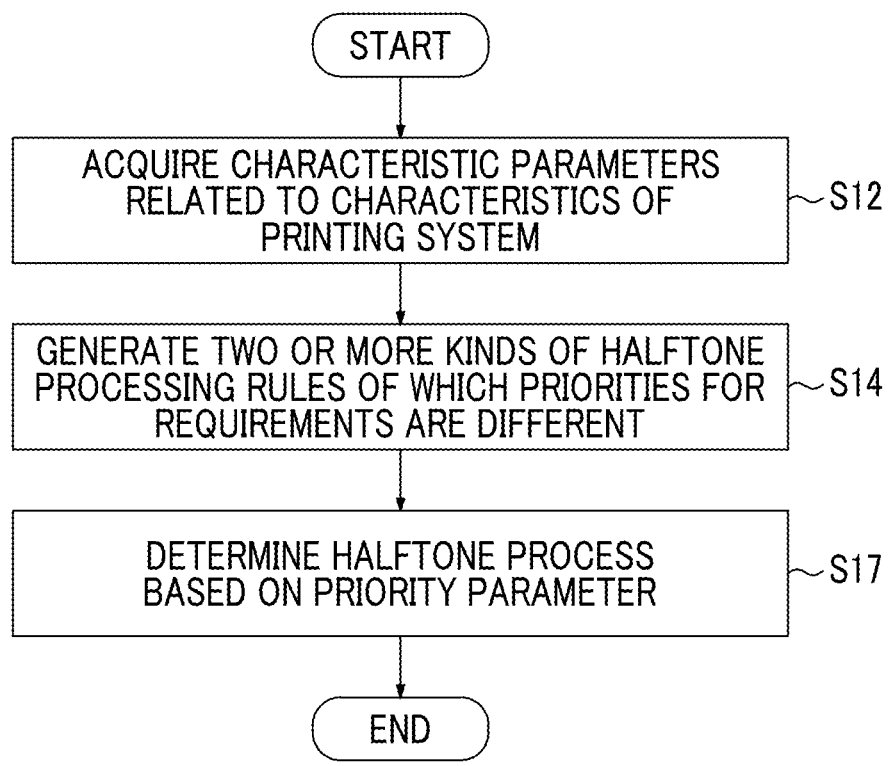
FIG. 20 is a flowchart showing an example of a method of determining the halftone processing rule according to another embodiment.

A method of determining the halftone processing rule in the printing system 10 according to the embodiment shown in FIG. 19 will be described. FIG. 20 is a flowchart showing an example of the method of determining the halftone processing rule as the image processing method according to the embodiment shown in FIG. 19. In FIG. 20, the same or similar steps as or to those of the flowchart described in FIG. 4 will be assigned the same step numbers.

Initially, the characteristic parameters related to the characteristics of the printing system are acquired (step S12). When the characteristic parameters are acquired, the input using the user interface may be performed, but it is preferable that the characteristic parameters are automatically acquired by analyzing the read image of the characteristic parameter acquisition chart. Step S12 is one example of a "characteristics parameter acquisition step".

Subsequently, two or more kinds of halftone processing rules of which priorities for the requirement required in the halftone process are different are generated (step S14). When the halftone processing rules are generated, the multiple kinds of halftone processing rules are generated based on the characteristic parameters. One kind of halftone processing rule is determined from the two or more kinds of generated halftone processing rules based on the parameter (step S17). That is, the combination of step S14 and step S17 corresponds to one example of a "halftone process generation step". A stepwise-process is performed such that two or more kinds of halftone processing rules are generated in step S14 as a previous stage for acquiring one optimum halftone process by the system and one kind of optimum processing rule is selected from the two or more kinds of generated halftone processing rules in step S14 based on the priority parameter in step S17.

However, when the present invention is implemented, the present invention is not necessarily limited to the configuration in which the step of the stepwise process shown in FIG. 20 is performed. For example, an evaluation function that reflects the setting of the priority parameter may be defined, and one kind of halftone processing rule may be generated using an optimum method of searching an optimum solution which maximizes or minimizes the evaluation value as the value of the evaluation function for the combination of the halftone algorithm and the halftone parameter.

In this case, the multiple kinds of halftone processing rules may be generated during the calculation process of calculating the optimum solution, but the halftone processing rule generated as the kind of the halftone process capable of being ultimately used in the system may be analyzed to be one kind of halftone processing rule as the optimum solution.

<Selection of Halftone Process>

As the method of selecting one halftone processing rule from the two or more kinds of halftone processing rules, in the present example, the system has an automatic selection function of automatically selecting one halftone process.

The printing system 10 of the present embodiment retains the priority parameters for the plurality of requirements in the priority parameter retention unit 56. For example, as the first classification (a), there are image quality, system cost and a halftone generating time. As the second classification (b), there are granularity and tolerance to a system error. The system previously retains the following priority parameters A, B, C, D, p, q or r, and calculates the total evaluation value by using the following expression.

Total evaluation value=$A$×image quality evaluation value+$B$×system cost+$C$×halftone generating time+$D$×halftone processing time Image quality evaluation value=$p$×granularity evaluation value[system error absence]+$q$×{granularity evaluation value[system error presence(addition of "+predetermined amount" error to first group)]+granularity evaluation value[system error presence(addition of "+predetermined amount" error to second group)]+ . . . +granularity evaluation value[system error presence (addition of "−predetermined amount" error to first group)]+granularity evaluation value[system error presence(addition of "−predetermined amount" error to second group)]+ . . . }+$r$×{streak evaluation value[system error presence (addition of "+predetermined amount" error to first group)]+streak evaluation value[system error presence(addition of "+predetermined amount" error to second group)]+ . . . +streak evaluation value[system error presence(addition of "−predetermined amount" error to first group)]+streak evaluation value[system error presence(addition of "−predetermined amount" error to second group)]+ . . . }

Here, the quantitative evaluation value of the granularity evaluation value or the streak evaluation value for acquiring the image quality evaluation value may be acquired by generating the simulation image by the above-described method from the halftone processing result of the dedicated halftone selection chart and calculating the granularity evaluation value or the streak evaluation value. In order to acquire the granularity or streak evaluation value for the system error, the generation of the simulation image in this case includes the generation of the simulation image by respectively adding the errors to the dots of the pixel group of which the printing order, the path or the timing belongs to the same condition.

The simulation condition applied at the time of the previous-stage halftone process generation does not necessarily coincide with the simulation condition applied at the time of the simulation image quality evaluation in the halftone automatic selection. For example, the simulation in the halftone process generation may be performed in the condition in which the factor of the landing interference is not included or the condition in which the simulation is performed in consideration of only the "dot movement" of the factor of the landing interference, and the simulation in the halftone automatic selection may be performed including all the changes of the dot movement, the dot shape and the dot density of the landing interference in order to reliably reproduce the real image if possible. The "halftone process generation" mentioned herein refers to the generation of the halftone parameter in a case where the halftone algorithm is the dither method or the error diffusion method, and refers to the generation of the halftone image to be described below in a case where the halftone algorithm is the DBS method.

The total evaluation value is one example of a "determination evaluation value", and is a determination evaluation value calculated by the determination-evaluation-value calculation unit 59 of FIG. 19. The real numbers indicating the priorities are set to the priority parameters A, B, C, D, p, q and r.

<Halftone Selection Chart>

For example, as the dedicated halftone selection chart, a chart including patches for gradations acquired by arranging a primary color such as cyan, magenta, yellow or black, a secondary color such as red, green or blue, a tertiary color or a quaternary color may be used. The halftone selection chart may include a gradation image acquired by continuously changing a gradation value instead of a patch which is acquired by discretely changing a gradation value in the predetermined gradation level for each color, or by combining these patches.

The halftone selection chart may include a gradation image or a patch having a uniform density of a predetermined gradation according to a special color such as sky blue or pale orange. As the kind of the "special color", various colors may be set. The sky blue or the pale orange are examples of colors in which the granularity becomes a particularly sensitive issue in the printed material. As stated above, the particularly important color in the printed material is set as the "special color", and may be included in the image of the halftone selection chart.

Here, when the quantitative evaluation value is calculated, the granularity evaluation value or the streak evaluation value are appropriately acquired for each color, each gradation, sky blue or pale orange by averaging the values of the granularity evaluation values or the streak evaluation values of the halftone processing result from the halftone selection chart.

As the predetermined amount of the added error (that is, a predetermined error amount), an appropriate value may be separately determined, or may be a standard deviation calculated from the reading result of the characteristic parameter acquisition chart.

Alternatively, instead of the calculation of the evaluation value based on the simulation image, the halftone selection chart output by the printing device 24 may be read by the image reading device 26, the granularity evaluation value or the streak evaluation value may be calculated from the read image, the values of the evaluation values may be appropriately averaged for each color, each gradation, sky blue or pale orange, and the image quality evaluation value may be acquired by the following expression.

$$\text{Image quality evaluation value} = p \times \text{granularity evaluation value} + r \times \text{streak evaluation value}$$

In a case where the halftone selection chart is printed, the user may compare the qualities of the halftone processes from the results of the halftone processes represented in the chart, and may use this chart as determination information when an appropriate halftone process is selected. For example, since the qualities of the multiple kinds of halftone processes can be compared, the halftone selection chart may be generated in which the processing results of the multiple kinds of halftone processes are provided on one printing medium.

One example of the halftone selection chart is as already described in FIG. 15.

In a case where the charts representing the same halftone processing result are output multiple times while temporally shifting the printing timings and/or while spatially shifting the printing places, the image quality evaluation value may be acquired using the representative value such as the average value, the maximum value or the minimum value of the granularity evaluation values or the streak evaluation values of the respective charts depending on the priority parameters of the second classification (b) related to the requirements already described.

The respective allowable thresholds may be set to the image quality evaluation value, the system cost, the halftone generating time, the halftone processing time, the granularity evaluation value [system error absence], the granularity evaluation value [system error presence] and the streak evaluation value, the halftone processing rules of which the value is equal to or greater than the threshold may be initially extracted, and an optimum halftone process may be determined based on the total evaluation value from the extracted halftone processing rules.

For example, in a case where there is an attempt to determine the halftone process in which the system cost is as low as possible, there is a method of acquiring the total evaluation value by initially extracting the halftone processes of which the value is equal to or greater than the allowable threshold for the image quality evaluation value, the system cost, the halftone generating time, the halftone processing time, the granularity evaluation value [system error absence], the granularity evaluation value [system error presence] and the streak evaluation value and setting the priority parameter B to be a large value.

<Combination of User Selection and Automatic Selection of Halftone Process>

Even in a case where one halftone processing rule is automatically selected (determined) by the system according to the setting of the priority parameter, the halftone processing rule determined by the automatic selection may be appropriately changed by the user. It is preferable that various halftone processing rules generated by the image processing device 20 are registered as a line-up such that the halftone processing rule can be reselected by changing the setting of the priority parameter by the user operation or the program of the system.

It is preferable that information items of the quantitative evaluation value of the granularity or streaks, the halftone generating time, the halftone processing time and the system cost related to the halftone processing rule are stored in association with the halftone processing rule such that these information items are referred to if necessary.

Meanwhile, in a case where the output result of the halftone selection chart is read and the quantitative evaluation value of the granularity or streak is calculated from the read image, the calculation result may be displayed on the screen of the user interface. The user can select an appropriate halftone process by referring to the quantitative evaluation value displayed on the screen of the user interface and checking the printed material of the halftone selection chart.

As another method, in a case where the output result of the halftone selection chart is read and the quantitative evaluation value of the granularity or streak is calculated from the read image, the calculation result may be additionally printed on the read halftone selection chart. Alternatively, after the read halftone selection chart is output, when the same halftone selection chart is output, the already calculated quantitative evaluation value of the granularity or streak may be printed.

In a case where the information of the quantitative evaluation value of the granularity or streak is presented, an aspect in which a portion of the patch in which a difference in evaluation value or a change in evaluation value necessary to alert the user is generated is highlighted on the screen or the printed material is preferable.

For example, in a case where the halftone selection chart is output over multiple pages with a temporal difference between the printing timings and the change with a change in time is checked, the notification that a change in quantitative evaluation value calculated from the read image of the halftone selection chart exceeds an allowable range and is large may be highlighted so as to alert the user. In this case, the history of the quantitative evaluation value is stored in the memory, and a differentiated display or another highlight display is performed in a case where the change amount of the quantitative evaluation value exceeds the allowable range.

In addition to checking the temporal system error, that is, instability of the system for time using the halftone selection chart, it is possible to check the system error depending on the printing position (place) on the printing medium, that is, the instability of the system for the space (place) by using the halftone selection chart. In this case, the notification that a difference in quantitative evaluation value exceeds the allowable range and is large due to a difference in place may be highlighted so as to alert the user.

After one halftone processing rule is selected by the automatic selection of the system or the selection operation of the user, a plurality of other halftone processing rules of which the priority balances of the first classification (a) and the second classification (b) of the requirements approximate the selected halftone processing rule may be further generated, the image quality evaluation value or the total evaluation value may be calculated based on the priority parameter or the halftone selection chart may be output, and the system or the user may select an optimum halftone processing rule and the calculated values or output halftone selection chart. In a case where the system automatically selects the halftone process, the halftone processing rule may be repeatedly generated until the image quality evaluation value or the total evaluation value is equal to or greater than a predetermined threshold.

<Variation of System Configuration>

The respective devices such as the means for acquiring the characteristic parameters related to the characteristics of the printing system, that is, the device that allows the user to input the characteristic parameters, the chart output control device that outputs the characteristic parameter acquisition chart, the printing device that prints the characteristic parameter acquisition charts according to the control, the device that reads the characteristic parameter acquisition charts and acquires the characteristic parameters based on the analyzing result of the read image, the device that generates two or more kinds of halftone processing rules, the chart output control device that outputs the halftone selection charts, the device that generates the simulation image from the halftone processing result of the halftone selection chart, the device that reads the output result of the halftone selection chart and calculates the image evaluation value from the chart read image and the device that allows the user to perform the operation of selecting the halftone processing rule may be an integrated-type system, or may be a functionally-distributed separation type system provided by combining a plurality of systems.

As the device that determines the halftone process based on the priority parameter, a device that generates the simulation image from the halftone processing result of the halftone selection chart and determines the halftone process" may be used. Alternatively, as the device that determines the halftone process based on the priority parameter, a combination of a "device that outputs the halftone selection chart generated by applying the halftone process as the selection candidate" and a "device that reads the printed material of the output halftone selection chart and determines the halftone process from the chart read image" may be used.

[Modification Example 1 of System Configuration]

For example, the device that performs the process of acquiring the characteristic parameter and the device that performs the process of generating the halftone processing rule may be provided as different devices.

[Modification Example 2 of System Configuration]

The device that performs the process of outputting the halftone selection chart and the device that allows the user to perform the selection operation of the halftone process may be provided as different devices.

[Modification Example 3 of System Configuration]

The device that performs the process of acquiring the characteristic parameter and the device that retains the priority parameter and performs the process of generating the halftone processing rule may be provided as different devices.

[Modification Example 4 of System Configuration]

As another configuration example, the device that performs the process of outputting the characteristic parameter acquisition chart, the image reading device that reads the output characteristic parameter acquisition chart, the device that performs the process of generating and acquiring the characteristic parameter from the read image of the characteristic parameter acquisition chart and the device that performs the process of generating the halftone processing rule using the acquired characteristic parameter may be provided as different devices.

For example, the operation form may be configured such that the process of outputting the characteristic parameter acquisition charts or the halftone selection charts and reading the images of the charts is performed in a factory of a printing machine manufacturer or a local printing system of a printer company, the acquired read images are collectively sent to a server of the printing machine manufacturer of a development branch or a separate company, the acquisition of the characteristic parameters and the generation of the halftone processing rules are performed in a system of the development branch or the separate company, the generated halftone processing rules are repeatedly sent to the original individual local printing system.

<Program Causing Computer to Function as Image Processing Device>

As the image processing device described in the above-described embodiments, programs for operating a computer may be recorded a compact disc read-only memory (CD-ROM), a magnetic disk, and a computer-readable medium (non-transitory tangible information storage medium), and the programs may be provided through the information storage medium. Instead of the aspect in which the programs are provided while being stored in the information storage medium, program signals may be provided as a download service via a communication network such as the Internet.

The programs are incorporated in the computer, and thus, the computer may realize the function of the image processing device 20. A part or all of the programs for realizing printing control including the image processing function described in the present embodiment may be incorporated in a higher control device such as a host computer, or may be operated as an operating program of a central processing unit (CPU) of the printing device 24.

<<Printing Medium>>

The "printing medium" is referred to as various terms such as a print medium, a printed medium, an image forming target medium, an image receiving medium, a jetted medium, and a recording sheet. When the present invention is implemented, the material or shape of the printing medium is not particularly limited, and various sheets such as resin sheet such as continuous paper, cut paper, seal paper or overhead projector (OHP) sheet, film, fabric, nonwoven fabric, a printed board on which a wiring pattern is formed, and rubber sheet may be used irrespective of the material or shape thereof.

<Advantages of Embodiments>

[1] According to the above-described embodiments of the present invention, it is possible to generate the two or more kinds of halftone processing rules of which priorities of the respective requirements are different based on the characteristic parameters of the printing system, and it is possible to determine one halftone processing rule used in the printing by the user selection or the system automatic selection. Accordingly, it is possible to realize the optimum halftone process.

[2] According to the above-described embodiments of the invention, the halftone selection chart is output by the printing system, and thus, it is possible to actually check the processing results of the two or more kinds of halftone processes performed by the printing system as the printed material. The user can select one halftone processing rule used in the printing by checking the printing result of the halftone selection chart. Thus, it is possible to determine the optimum halftone process which is appropriate for the characteristics of the printing system and satisfies the halftone performance required by the user.

[3] According to the above-described embodiments of the invention, it is possible to generate the optimum halftone processing rule which satisfies the required halftone performance and is appropriate for the characteristics of the printing system based on the characteristic parameters related to the characteristics of the printing system and the priority parameters related to the priorities for the plurality of requirements required in the halftone process.

The constituent requirements of the above-described embodiments of the present invention may be changed, added and removed without departing from the gist of the present invention. The present invention is not limited to the above-described embodiment, and may be variously modified by those skilled in the art within the technical spirit of the present invention.

EXPLANATION OF REFERENCES

10: printing system
20: image processing device
24: printing device
26: image reading device
32: display device
34: input device
52: characteristic parameter acquisition unit
54: characteristic parameter storage unit
56: priority parameter retention unit
58: halftone process generation unit
58A: previous-stage halftone process generation unit
58B; halftone automatic selection unit
59: determination-evaluation-value calculation unit
60: halftone-processing-rule storage unit
62: characteristic-parameter-acquisition-chart generation unit
64: image analysis unit
70: evaluation value calculation unit
74: image quality evaluation processing unit
76: halftone-selection-chart generation unit
100: characteristic parameter acquisition chart
101: printing medium
150: halftone selection chart
151, 152: primary color patch

What is claimed is:

1. A printing system comprising a processor configured to perform as:
   a halftone-selection-chart output unit configured to output a halftone selection chart including quality comparison and evaluation image regions of two or more kinds of halftone processes by using the two or more kinds of halftone processes of which balances of priority for a plurality of requirements required in the halftone processes are different;
   a halftone selection operating unit configured to receive a user operation of selecting any one kind of halftone process from the two or more kinds of halftone processes used in the halftone selection chart output by the halftone-selection-chart output unit;
   an image quality evaluation processing unit configured to evaluate an image quality including a streak of a simulation image of a printed image generated based on characteristic parameters related to characteristics of the printing system; and
   a halftone process generation unit configured to generate halftone processing rules that define processing contents of the two or more kinds of halftone processes based on evaluation of the image quality including a streak of the simulation image.

2. The printing system according to claim 1,
   wherein the halftone selection chart has a configuration in which the comparison and evaluation image regions for the kinds of the halftone processes indicating processing results of the two or more kinds of halftone processes are arranged on one printing medium.

3. The printing system according to claim 1,
wherein: the halftone-selection-chart output unit outputs a plurality of halftone selection charts by outputting images having the same halftone processing result for the respective halftone processes at different printing timings multiple times; and
the halftone selection operating unit receives a user operation of selecting any one kind of halftone process from the two or more kinds of halftone processes based on the plurality of halftone selection charts output by the halftone-selection-chart output unit.

4. The printing system according to claim 1,
wherein the halftone processing rule is specified by a combination of a halftone algorithm and a halftone parameter, and
in the two or more kinds of halftone processes, at least one of the halftone algorithm or the halftone parameter is different.

5. The printing system according to of claim 4,
wherein the halftone algorithm includes at least one method of a dither method, an error diffusion method, or a direct binary search method.

6. The printing system according to claim 4,
wherein the halftone parameter includes at least one parameter of a threshold and a size of a dither mask in the dither method, a size of an error diffusion matrix, a diffusion coefficient, and setting of an applied gradation section of the error diffusion matrix in the error diffusion method, the number of times pixels are updated and an exchange pixel range in the direct binary search method, or a parameter for evaluating system error tolerance.

7. The printing system according to claim 1,
wherein the printing system includes an image forming unit that includes a plurality of printing elements serving to form dots on a printing medium, and
the characteristics of the printing system are characteristics that include at least one of individual recording characteristics of the plurality of printing elements or common characteristics to the plurality of printing elements.

8. The printing system according to claim 7,
wherein the recording characteristics are characteristics that include at least one of a dot density, a dot diameter, a dot shape, a dot recording position error, or recording inexecutable abnormality.

9. The printing system according to claim 7,
wherein the common characteristics are characteristics that include at least one of an average dot density, an average dot diameter, an average dot shape, or landing interference.

10. The printing system according to claim 2,
wherein the plurality of requirements includes at least two items of image quality, cost, a halftone generating time, a halftone processing time, tolerance to a system error, or tolerance to environment change.

11. A halftone process determination method of determining a kind of a halftone process used to generate a halftone image, the method executed by a processor, the method comprising:
a halftone-selection-chart output step of outputting a halftone selection chart including quality comparison and evaluation image regions of two or more kinds of halftone processes by using the two or more kinds of halftone processes of which balances of priority for a plurality of requirements required in the halftone processes are different;
a halftone selection operating step of receiving a user operation of selecting any one kind of halftone process from the two or more kinds of halftone processes used in the halftone selection chart output in the halftone-selection-chart output step;
an image quality evaluation processing step of evaluating an image quality including a streak of a simulation image of a printed image generated based on characteristic parameters related to characteristics of the printing system; and
a halftone process generation step of generating halftone processing rules that define processing contents of the two or more kinds of halftone processes based on evaluation of the image quality including a streak of the simulation image.

12. The halftone process determination method according to claim 11,
wherein the halftone selection chart has a configuration in which the comparison and evaluation image regions for the kinds of the halftone processes indicating processing results of the two or more kinds of halftone processes are arranged on one printing medium.

13. The halftone process determination method according to claim 11,
wherein: a plurality of halftone selection charts are output by outputting images having the same halftone processing result for the respective halftone processes at different printing timings multiple times in the halftone-selection-chart output step; and
in the halftone selection operating step, a user operation of selecting any one kind of halftone process from the two or more kinds of halftone processes based on the plurality of halftone selection charts output in the halftone-selection-chart output step is received.

14. An image processing device comprising a processor configured to perform as:
a halftone-selection-chart generation unit configured to generate chart data of a halftone selection chart including quality comparison and evaluation image regions of two or more kinds of halftone processes by using the two or more kinds of halftone processes of which balances of priority for a plurality of requirements required in the halftone processes are different;
a halftone selection operating unit configured to receive a user operation of selecting any one kind of halftone process from the two or more kinds of halftone processes used in the halftone selection chart printed based on the chart data;
an image quality evaluation processing unit configured to evaluate an image quality including a streak of a simulation image of a printed image generated based on characteristic parameters related to characteristics of the printing system; and
a halftone process generation unit configured to generate halftone processing rules that define processing contents of the two or more kinds of halftone processes based on evaluation of the image quality including a streak of the simulation image.

15. The image processing device according to claim 14,
wherein the halftone selection chart has a configuration in which the comparison and evaluation image regions for the kinds of the halftone processes indicating processing results of the two or more kinds of halftone processes are arranged on one printing medium.

16. A non-transitory and tangible computer-readable recording medium which stores a program, such that when the program is read and executed by the computer, the computer functions as:
- a halftone-selection-chart generation unit configured to generate chart data of a halftone selection chart including quality comparison and evaluation image regions of two or more kinds of halftone processes by using the two or more kinds of halftone processes of which balances of priority for a plurality of requirements required in the halftone processes are different;
- a halftone selection operating unit configured to receive a user operation of selecting any one kind of halftone process from the two or more kinds of halftone processes used in the halftone selection chart printed based on the chart data;
- an image quality evaluation processing unit configured to evaluate an image quality including a streak of a simulation image of a printed image generated based on characteristic parameters related to characteristics of the printing system; and
- a halftone process generation unit configured to generate halftone processing rules that define processing contents of the two or more kinds of halftone processes based on evaluation of the image quality including a streak of the simulation image.

17. The image processing device according to claim 14, wherein; the halftone-selection-chart output unit outputs a plurality of halftone selection charts by outputting images having the same halftone processing result for the respective halftone processes at different printing timings multiple times; and
the halftone selection operating unit receives a user operation of selecting any one kind of halftone process from the two or more kinds of halftone processes based on the plurality of halftone selection charts printed based on the chart data.

18. The non-transitory and tangible computer-readable recording medium according to claim 16,
wherein: the halftone-selection-chart output unit outputs a plurality of halftone selection charts by outputting images having the same halftone processing result for the respective halftone processes at different printing timings multiple times; and
the halftone selection operating unit receives a user operation of selecting any one kind of halftone process from the two or more kinds of halftone processes based on the plurality of halftone selection charts printed based on the chart data.

19. The non-transitory and tangible computer-readable recording medium according to claim 16,
wherein the halftone selection chart has a configuration in which the comparison and evaluation image regions for the kinds of the halftone processes indicating processing results of the two or more kinds of halftone processes are arranged on one printing medium.

* * * * *